US012394388B2

(12) United States Patent
Sim et al.

(10) Patent No.: US 12,394,388 B2
(45) Date of Patent: Aug. 19, 2025

(54) TIME-SHIFTED WAVEFORMS FOR MULTI-PARTICLE ELECTROPHORETIC DISPLAYS PROVIDING LOW-FLASH IMAGE UPDATES

(71) Applicant: E INK CORPORATION, Billerica, MA (US)

(72) Inventors: Teck Ping Sim, Acton, MA (US); Kosta Ladavac, Cambridge, MA (US); Yuval Ben-Dov, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/753,397

(22) Filed: Jun. 25, 2024

(65) Prior Publication Data

US 2025/0006146 A1 Jan. 2, 2025

Related U.S. Application Data

(60) Provisional application No. 63/523,484, filed on Jun. 27, 2023.

(51) Int. Cl.
*G09G 3/34* (2006.01)

(52) U.S. Cl.
CPC ....... *G09G 3/3446* (2013.01); *G09G 2300/08* (2013.01); *G09G 2310/068* (2013.01); *G09G 2320/0247* (2013.01)

(58) Field of Classification Search
CPC ........... G02B 26/026; G02F 1/161–169; G02F 2001/1635–1678; G02F 2001/164; G09G 3/344; G09G 3/3446; G09G 5/06; G09G 2300/08; G09G 2310/068; G09G 2320/0247; G09G 2320/0285; G09G 2310/06; G09G 2320/0204; G09G 2320/0257
See application file for complete search history.

(56) References Cited

U.S. PATENT DOCUMENTS

| | | | |
|---|---|---|---|
| 4,418,346 | A | 11/1983 | Batchelder |
| 5,872,552 | A | 2/1999 | Gordon, II et al. |
| 5,930,026 | A | 7/1999 | Jacobson et al. |

(Continued)

OTHER PUBLICATIONS

Kitamura, T. et al., “Electrical toner movement for electronic paper-like display”, Asia Display/IDW ’01, pp. 1517-1520, Paper HCS1-1 (2001).

(Continued)

*Primary Examiner* — Amr A Awad
*Assistant Examiner* — Aaron Midkiff
(74) *Attorney, Agent, or Firm* — Brian D. Bean

(57) ABSTRACT

Electrophoretic displays with multi-particle electrophoretic media and improved methods for driving such multi-particle electrophoretic media, especially using active matrix backplanes and controllers. Larger look-up tables are used, which include a plurality of time-shifted waveforms for each color transition. The controller can thus easily cause a phase shift in the color flashes across the display, which ultimate diminishes or removes the perception that the device is “flashing” during an update from a first image to a second image. The methods are generalizable to any electrophoretic display using waveforms, and are particularly well-suited for newer multi-particle electrophoretic displays capable of producing four or more colors at each pixel.

10 Claims, 16 Drawing Sheets

(56) References Cited

U.S. PATENT DOCUMENTS

| | | | |
|---|---|---|---|
| 6,017,584 | A | 1/2000 | Albert et al. |
| 6,130,774 | A | 10/2000 | Albert et al. |
| 6,144,361 | A | 11/2000 | Gordon, II et al. |
| 6,172,798 | B1 | 1/2001 | Albert et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,545,797 | B2 | 4/2003 | Chen et al. |
| 6,664,944 | B1 | 12/2003 | Albert et al. |
| 6,672,921 | B1 | 1/2004 | Liang et al. |
| 6,753,999 | B2 | 6/2004 | Zehner et al. |
| 6,788,449 | B2 | 9/2004 | Liang et al. |
| 6,788,452 | B2 | 9/2004 | Liang et al. |
| 6,825,970 | B2 | 11/2004 | Goenaga et al. |
| 6,864,875 | B2 | 3/2005 | Drzaic et al. |
| 6,866,760 | B2 | 3/2005 | Paolini, Jr. et al. |
| 6,900,851 | B2 | 5/2005 | Morrison et al. |
| 6,914,714 | B2 | 7/2005 | Chen et al. |
| 6,922,276 | B2 | 7/2005 | Zhang et al. |
| 6,972,893 | B2 | 12/2005 | Chen et al. |
| 6,982,178 | B2 | 1/2006 | LeCain et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,023,420 | B2 | 4/2006 | Comiskey et al. |
| 7,034,783 | B2 | 4/2006 | Gates et al. |
| 7,038,656 | B2 | 5/2006 | Liang et al. |
| 7,038,670 | B2 | 5/2006 | Liang et al. |
| 7,046,228 | B2 | 5/2006 | Liang et al. |
| 7,052,571 | B2 | 5/2006 | Wang et al. |
| 7,061,166 | B2 | 6/2006 | Kuniyasu |
| 7,061,662 | B2 | 6/2006 | Chung et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,144,942 | B2 | 12/2006 | Zang et al. |
| 7,167,155 | B1 | 1/2007 | Albert et al. |
| 7,170,670 | B2 | 1/2007 | Webber |
| 7,176,880 | B2 | 2/2007 | Amundson et al. |
| 7,177,066 | B2 | 2/2007 | Chung et al. |
| 7,193,625 | B2 | 3/2007 | Danner et al. |
| 7,202,847 | B2 | 4/2007 | Gates |
| 7,236,291 | B2 | 6/2007 | Kaga et al. |
| 7,242,514 | B2 | 7/2007 | Chung et al. |
| 7,259,744 | B2 | 8/2007 | Arango et al. |
| 7,304,787 | B2 | 12/2007 | Whitesides et al. |
| 7,312,784 | B2 | 12/2007 | Baucom et al. |
| 7,312,794 | B2 | 12/2007 | Zehner et al. |
| 7,321,459 | B2 | 1/2008 | Masuda |
| 7,327,511 | B2 | 2/2008 | Whitesides et al. |
| 7,339,715 | B2 | 3/2008 | Webber et al. |
| 7,385,751 | B2 | 6/2008 | Chen et al. |
| 7,408,699 | B2 | 8/2008 | Wang et al. |
| 7,411,719 | B2 | 8/2008 | Paolini, Jr. et al. |
| 7,453,445 | B2 | 11/2008 | Amundson |
| 7,492,339 | B2 | 2/2009 | Amundson |
| 7,492,505 | B2 | 2/2009 | Liang et al. |
| 7,528,822 | B2 | 5/2009 | Amundson et al. |
| 7,535,624 | B2 | 5/2009 | Amundson et al. |
| 7,545,358 | B2 | 6/2009 | Gates et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,667,684 | B2 | 2/2010 | Jacobson et al. |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,684,108 | B2 | 3/2010 | Wang et al. |
| 7,688,297 | B2 | 3/2010 | Zehner et al. |
| 7,715,088 | B2 | 5/2010 | Liang et al. |
| 7,729,039 | B2 | 6/2010 | LeCain et al. |
| 7,733,311 | B2 | 6/2010 | Amundson et al. |
| 7,733,335 | B2 | 6/2010 | Zehner et al. |
| 7,787,169 | B2 | 8/2010 | Abramson et al. |
| 7,791,789 | B2 | 9/2010 | Albert et al. |
| 7,800,813 | B2 | 9/2010 | Wu et al. |
| 7,821,702 | B2 | 10/2010 | Liang et al. |
| 7,839,564 | B2 | 11/2010 | Whitesides et al. |
| 7,859,742 | B1 | 12/2010 | Chiu et al. |
| 7,910,175 | B2 | 3/2011 | Webber |
| 7,952,557 | B2 | 5/2011 | Amundson |
| 7,952,790 | B2 | 5/2011 | Honeyman et al. |
| 7,956,841 | B2 | 6/2011 | Albert et al. |
| 7,982,479 | B2 | 7/2011 | Wang et al. |
| 7,982,941 | B2 | 7/2011 | Lin et al. |
| 7,999,787 | B2 | 8/2011 | Amundson et al. |
| 8,009,348 | B2 | 8/2011 | Zehner et al. |
| 8,040,594 | B2 | 10/2011 | Paolini, Jr. et al. |
| 8,054,526 | B2 | 11/2011 | Bouchard |
| 8,077,141 | B2 | 12/2011 | Duthaler et al. |
| 8,098,418 | B2 | 1/2012 | Paolini, Jr. et al. |
| 8,125,501 | B2 | 2/2012 | Amundson et al. |
| 8,139,050 | B2 | 3/2012 | Jacobson et al. |
| 8,159,636 | B2 | 4/2012 | Sun et al. |
| 8,174,490 | B2 | 5/2012 | Whitesides et al. |
| 8,213,076 | B2 | 7/2012 | Albert et al. |
| 8,243,013 | B1 | 8/2012 | Sprague et al. |
| 8,274,472 | B1 | 9/2012 | Wang et al. |
| 8,289,250 | B2 | 10/2012 | Zehner et al. |
| 8,300,006 | B2 | 10/2012 | Zhou et al. |
| 8,305,341 | B2 | 11/2012 | Arango et al. |
| 8,314,784 | B2 | 11/2012 | Ohkami et al. |
| 8,363,299 | B2 | 1/2013 | Paolini, Jr. et al. |
| 8,373,649 | B2 | 2/2013 | Low et al. |
| 8,384,658 | B2 | 2/2013 | Albert et al. |
| 8,422,116 | B2 | 4/2013 | Sprague et al. |
| 8,441,714 | B2 | 5/2013 | Paolini, Jr. et al. |
| 8,441,716 | B2 | 5/2013 | Paolini, Jr. et al. |
| 8,456,414 | B2 | 6/2013 | Lin et al. |
| 8,462,102 | B2 | 6/2013 | Wong et al. |
| 8,466,852 | B2 | 6/2013 | Drzaic et al. |
| 8,503,063 | B2 | 8/2013 | Sprague |
| 8,514,168 | B2 | 8/2013 | Chung et al. |
| 8,537,105 | B2 | 9/2013 | Chiu et al. |
| 8,558,783 | B2 | 10/2013 | Wilcox et al. |
| 8,558,785 | B2 | 10/2013 | Zehner et al. |
| 8,558,786 | B2 | 10/2013 | Lin |
| 8,558,855 | B2 | 10/2013 | Sprague et al. |
| 8,576,164 | B2 | 11/2013 | Sprague et al. |
| 8,576,259 | B2 | 11/2013 | Lin et al. |
| 8,576,470 | B2 | 11/2013 | Paolini, Jr. et al. |
| 8,576,475 | B2 | 11/2013 | Huang et al. |
| 8,576,476 | B2 | 11/2013 | Telfer et al. |
| 8,593,396 | B2 | 11/2013 | Amundson et al. |
| 8,593,721 | B2 | 11/2013 | Albert et al. |
| 8,605,032 | B2 | 12/2013 | Liu et al. |
| 8,605,354 | B2 | 12/2013 | Zhang et al. |
| 8,643,595 | B2 | 2/2014 | Chung et al. |
| 8,649,084 | B2 | 2/2014 | Wang et al. |
| 8,665,206 | B2 | 3/2014 | Lin et al. |
| 8,670,174 | B2 | 3/2014 | Sprague et al. |
| 8,681,191 | B2 | 3/2014 | Yang et al. |
| 8,704,756 | B2 | 4/2014 | Lin |
| 8,717,664 | B2 | 5/2014 | Wang et al. |
| 8,730,153 | B2 | 5/2014 | Sprague et al. |
| 8,786,935 | B2 | 7/2014 | Sprague |
| 8,797,634 | B2 | 8/2014 | Paolini, Jr. et al. |
| 8,810,525 | B2 | 8/2014 | Sprague |
| 8,810,899 | B2 | 8/2014 | Sprague et al. |
| 8,830,559 | B2 | 9/2014 | Honeyman et al. |
| 8,873,129 | B2 | 10/2014 | Paolini, Jr. et al. |
| 8,902,153 | B2 | 12/2014 | Bouchard et al. |
| 8,902,491 | B2 | 12/2014 | Wang et al. |
| 8,917,439 | B2 | 12/2014 | Wang et al. |
| 8,928,562 | B2 | 1/2015 | Gates et al. |
| 8,928,641 | B2 | 1/2015 | Chiu et al. |

(56) References Cited

U.S. PATENT DOCUMENTS

| | | | |
|---|---|---|---|
| 8,964,282 | B2 | 2/2015 | Wang et al. |
| 8,976,444 | B2 | 3/2015 | Zhang et al. |
| 9,013,394 | B2 | 4/2015 | Lin |
| 9,013,783 | B2 | 4/2015 | Sprague |
| 9,019,197 | B2 | 4/2015 | Lin |
| 9,019,198 | B2 | 4/2015 | Lin et al. |
| 9,019,318 | B2 | 4/2015 | Sprague et al. |
| 9,082,352 | B2 | 7/2015 | Cheng et al. |
| 9,116,412 | B2 | 8/2015 | Lin |
| 9,146,439 | B2 | 9/2015 | Zhang |
| 9,164,207 | B2 | 10/2015 | Honeyman et al. |
| 9,170,467 | B2 | 10/2015 | Whitesides et al. |
| 9,170,468 | B2 | 10/2015 | Lin et al. |
| 9,171,508 | B2 | 10/2015 | Sprague et al. |
| 9,182,646 | B2 | 11/2015 | Paolini, Jr. et al. |
| 9,195,111 | B2 | 11/2015 | Anseth et al. |
| 9,199,441 | B2 | 12/2015 | Danner |
| 9,218,773 | B2 | 12/2015 | Sun et al. |
| 9,224,338 | B2 | 12/2015 | Chan et al. |
| 9,224,342 | B2 | 12/2015 | Lin et al. |
| 9,224,344 | B2 | 12/2015 | Chung et al. |
| 9,230,492 | B2 | 1/2016 | Harrington et al. |
| 9,251,736 | B2 | 2/2016 | Lin et al. |
| 9,262,973 | B2 | 2/2016 | Wu et al. |
| 9,268,191 | B2 | 2/2016 | Paolini, Jr. et al. |
| 9,269,311 | B2 | 2/2016 | Amundson |
| 9,279,906 | B2 | 3/2016 | Kang |
| 9,285,649 | B2 | 3/2016 | Du et al. |
| 9,293,511 | B2 | 3/2016 | Jacobson et al. |
| 9,299,294 | B2 | 3/2016 | Lin et al. |
| 9,341,916 | B2 | 5/2016 | Telfer et al. |
| 9,360,733 | B2 | 6/2016 | Wang et al. |
| 9,361,836 | B1 | 6/2016 | Telfer et al. |
| 9,373,289 | B2 | 6/2016 | Sprague et al. |
| 9,383,623 | B2 | 7/2016 | Lin et al. |
| 9,390,066 | B2 | 7/2016 | Smith et al. |
| 9,390,661 | B2 | 7/2016 | Chiu et al. |
| 9,412,314 | B2 | 8/2016 | Amundson et al. |
| 9,423,666 | B2 | 8/2016 | Wang et al. |
| 9,459,510 | B2 | 10/2016 | Lin |
| 9,460,666 | B2 | 10/2016 | Sprague et al. |
| 9,495,918 | B2 | 11/2016 | Harrington et al. |
| 9,501,981 | B2 | 11/2016 | Lin et al. |
| 9,513,527 | B2 | 12/2016 | Chan et al. |
| 9,513,743 | B2 | 12/2016 | Sjodin et al. |
| 9,514,667 | B2 | 12/2016 | Lin |
| 9,541,814 | B2 | 1/2017 | Lin et al. |
| 9,542,895 | B2 | 1/2017 | Gates et al. |
| 9,564,088 | B2 | 2/2017 | Wilcox et al. |
| 9,612,502 | B2 | 4/2017 | Danner et al. |
| 9,620,048 | B2 | 4/2017 | Sim et al. |
| 9,620,067 | B2 | 4/2017 | Harrington et al. |
| 9,671,668 | B2 | 6/2017 | Chan et al. |
| 9,672,766 | B2 | 6/2017 | Sjodin |
| 9,691,333 | B2 | 6/2017 | Cheng et al. |
| 9,697,778 | B2 | 7/2017 | Telfer et al. |
| 9,721,495 | B2 | 8/2017 | Harrington et al. |
| 9,740,076 | B2 | 8/2017 | Paolini, Jr. et al. |
| 9,759,980 | B2 | 9/2017 | Du et al. |
| 9,792,861 | B2 | 10/2017 | Chang et al. |
| 9,792,862 | B2 | 10/2017 | Hung et al. |
| 9,812,073 | B2 | 11/2017 | Lin et al. |
| 9,835,925 | B1 | 12/2017 | Bull et al. |
| 9,921,451 | B2 | 3/2018 | Telfer et al. |
| 9,922,603 | B2 | 3/2018 | Lin |
| 9,966,018 | B2 | 5/2018 | Gates et al. |
| 10,032,419 | B2 | 7/2018 | Lin et al. |
| 10,162,242 | B2 | 12/2018 | Wang et al. |
| 10,209,556 | B2 | 2/2019 | Rosenfeld et al. |
| 10,229,641 | B2 | 3/2019 | Yang et al. |
| 10,276,109 | B2 | 4/2019 | Crounse et al. |
| 10,319,313 | B2 | 6/2019 | Harris et al. |
| 10,339,876 | B2 | 7/2019 | Lin et al. |
| 10,353,266 | B2 | 7/2019 | Bouchard et al. |
| 10,444,553 | B2 | 10/2019 | Laxton |
| 10,467,984 | B2 | 11/2019 | Buckley et al. |
| 10,475,399 | B2 | 11/2019 | Telfer et al. |
| 10,514,583 | B2 | 12/2019 | Zhang |
| 10,593,272 | B2 | 3/2020 | Telfer et al. |
| 10,657,869 | B2 | 5/2020 | Telfer et al. |
| 10,672,350 | B2 | 6/2020 | Amundson et al. |
| 11,049,463 | B2 | 6/2021 | Lin et al. |
| 11,640,803 | B2 | 5/2023 | Lin et al. |
| 11,686,989 | B2 | 6/2023 | Telfer et al. |
| 11,922,893 | B2 | 3/2024 | Crounse et al. |
| 2003/0102858 | A1 | 6/2003 | Jacobson et al. |
| 2004/0246562 | A1 | 12/2004 | Chung et al. |
| 2005/0253777 | A1 | 11/2005 | Zehner et al. |
| 2007/0091418 | A1 | 4/2007 | Danner et al. |
| 2007/0103427 | A1 | 5/2007 | Zhou et al. |
| 2007/0176912 | A1 | 8/2007 | Beames et al. |
| 2008/0024429 | A1 | 1/2008 | Zehner |
| 2008/0024482 | A1 | 1/2008 | Gates et al. |
| 2008/0043318 | A1 | 2/2008 | Whitesides et al. |
| 2008/0048970 | A1 | 2/2008 | Drzaic et al. |
| 2008/0136774 | A1 | 6/2008 | Harris et al. |
| 2008/0303780 | A1 | 12/2008 | Sprague et al. |
| 2009/0174651 | A1 | 7/2009 | Jacobson et al. |
| 2009/0225398 | A1 | 9/2009 | Duthaler et al. |
| 2009/0322721 | A1 | 12/2009 | Zehner et al. |
| 2010/0156780 | A1 | 6/2010 | Jacobson et al. |
| 2010/0194733 | A1 | 8/2010 | Lin et al. |
| 2010/0194789 | A1 | 8/2010 | Lin et al. |
| 2010/0220121 | A1 | 9/2010 | Zehner et al. |
| 2010/0265561 | A1 | 10/2010 | Gates et al. |
| 2011/0043543 | A1 | 2/2011 | Chen et al. |
| 2011/0063314 | A1 | 3/2011 | Chiu et al. |
| 2011/0193840 | A1 | 8/2011 | Amundson et al. |
| 2011/0193841 | A1 | 8/2011 | Amundson et al. |
| 2011/0199671 | A1 | 8/2011 | Amundson et al. |
| 2011/0221740 | A1 | 9/2011 | Yang et al. |
| 2012/0001957 | A1 | 1/2012 | Liu et al. |
| 2012/0098740 | A1 | 4/2012 | Chiu et al. |
| 2012/0326957 | A1 | 12/2012 | Drzaic et al. |
| 2013/0063333 | A1 | 3/2013 | Arango et al. |
| 2013/0242378 | A1 | 9/2013 | Paolini, Jr. et al. |
| 2013/0249782 | A1 | 9/2013 | Wu et al. |
| 2013/0278995 | A1 | 10/2013 | Drzaic et al. |
| 2014/0009817 | A1 | 1/2014 | Wilcox et al. |
| 2014/0055840 | A1 | 2/2014 | Zang et al. |
| 2014/0078576 | A1 | 3/2014 | Sprague |
| 2014/0204012 | A1 | 7/2014 | Wu et al. |
| 2014/0240210 | A1 | 8/2014 | Wu et al. |
| 2014/0253425 | A1 | 9/2014 | Zalesky et al. |
| 2014/0293398 | A1 | 10/2014 | Wang et al. |
| 2014/0362213 | A1 | 12/2014 | Tseng |
| 2015/0005720 | A1 | 1/2015 | Zang et al. |
| 2015/0118390 | A1 | 4/2015 | Rosenfeld et al. |
| 2015/0262255 | A1 | 9/2015 | Khajehnouri et al. |
| 2015/0262551 | A1 | 9/2015 | Zehner et al. |
| 2015/0268531 | A1 | 9/2015 | Wang et al. |
| 2015/0301246 | A1 | 10/2015 | Zang et al. |
| 2016/0012710 | A1 | 1/2016 | Lu et al. |
| 2016/0048054 | A1 | 2/2016 | Danner |
| 2016/0140910 | A1 | 5/2016 | Amundson |
| 2016/0180777 | A1 | 6/2016 | Lin et al. |
| 2017/0287377 | A1* | 10/2017 | Telfer .................. G09G 3/2003 |
| 2021/0056916 | A1* | 2/2021 | Emelie .................. G09G 3/344 |
| 2021/0132459 | A1 | 5/2021 | Bull |
| 2022/0084473 | A1 | 3/2022 | Telfer et al. |

OTHER PUBLICATIONS

Yamaguchi, Y. et al., "Toner display using insulative particles charged triboelectrically", Asia Display/IDW '01, pp. 1729-1730, Paper AMD4-4 (2001).

Dukhin, Andrei S. et al., "Aperiodic capillary electrophoresis method using an alternating current electric field for separation of macro-molecules", Electrophoresis, vol. 26, pp. 2149-2153 (2005).

(56) References Cited

OTHER PUBLICATIONS

European Patent Office, "International Search Report and Written Opinion", PCT/US2024/035370, Sep. 19, 2024.

* cited by examiner

TIME-SHIFTED WAVEFORMS FOR MULTI-PARTICLE ELECTROPHORETIC DISPLAYS PROVIDING LOW-FLASH IMAGE UPDATES

RELATED APPLICATIONS

This application claims priority to U.S. Provisional Application No. 63/523,484, filed Jun. 27, 2023. All patents and publications disclosed herein are incorporated by reference in their entireties.

BACKGROUND

An electrophoretic display (EPD) changes color by modifying the position of one or more charged colored particles with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders because the electrophoretic displays provide a book-like reading experience, use little power, and allow a user to carry a library of hundreds of books in a lightweight handheld device. Such devices are increasingly being adapted to display out-of-home (OOH) digital content, such as shelf labels, outdoor advertisement and transportation signage.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. patents, all of which are incorporated by reference in their entireties: U.S. Pat. Nos. 9,361,836, 9,921,451, 10,276,109, 10,353,266, 10,467,984, 10,593,272, and 10,657,869.

As described in the aforementioned patents, the waveforms (i.e., electric fields provided across the electrophoretic medium as a function of time) typically require substantial swings in voltage polarity in a short time. Because of this, in some instances, the colored electrophoretic display "flashes," "flickers," or "looks flashy" when switching between color images. This shortcoming is particularly pronounced when a full-color eReader is quickly switched (i.e., in less than 1 second) between full-color images. U.S. Pat. No. 10,657,869 addressed a similar issue, however the '869 patent does not suggest to use look up tables to store offset waveforms, as described below. Other patents owned by E Ink Corporation, such as U.S. Pat. No. 8,593,396 also provided solutions for shifting the initiation of a waveform or reducing (or increasing) the size of the waveform in order to improve gray scale control, however these patents did not appreciate that such adjustments would decrease flash when properly coordinated.

In particular, this invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances, two of the particles will be positively-charged, and one (or two) of the particles will be negatively-charged. In some instances one of the particles will be positively-charged, and three particles will be negatively-charged. In some instances one of the particles will be negatively-charged, and three particles will be positively-charged. The particles may additionally different in the type of charge species on the particle surface and/or the type of polymer(s) functionalized on the surface. The particles may comprise organic or inorganic pigments or dyes.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y, et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells;

see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066;

9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both.

Electrophoretic displays capable of rendering any color at any pixel location have been described in U.S. Pat. Nos. 10,475,399 and 10,678,111. In the '399 patent, a display is described in which a white (light-scattering) pigment moves in a first direction when addressed with a low applied voltage and in the opposite direction when addressed with a higher voltage. In the '111 patent, a full-color electrophoretic display is described in which there are four pigments: white, cyan, magenta and yellow, in which two of the pigments are positively-charged and two negatively charged. U.S. Patent Publication 2022/0082896 describes a full-color electrophoretic display in which there are four pigments: white, cyan, magenta and yellow, in which the three colored pigments are positively-charged and white pigment negatively charged. Embodiments of the present invention of this type are referred to as CMYW embodiments.

In addition, there are multi-particle display designs in which the color pigments scatter light (i.e., reflective color particles). U.S. Pat. No. 10,339,876 describes a display of this type having black, white and red particles capable of rendering three states. Similar display designs including four pigments can render four different colors, see, e.g. U.S. Pat. No. 9,922,603, or, by using a semi-transparent colored particle, such displays can render six colors, see, e.g., U.S. Pat. No. 11,640,803. Many of the multi-particle display designs using light-scattering particles incorporate lengthy and "flashy" updates, which some viewers find unappealing. The solutions described below can be used to decrease the "flashiness" of the updates in such displays, and typically require very little additional cost in terms of new controllers or drivers.

SUMMARY

Disclosed herein are improved methods of driving full color electrophoretic displays and full color electrophoretic displays using these drive methods. In one aspect, the invention includes an electrophoretic display, which includes a light-transmissive electrode, an active matrix backplane comprising a plurality of rows of pixel electrodes, each pixel electrode being coupled to a thin-film transistor comprising a gate line and a source line, an electrophoretic medium disposed between the light-transmissive electrode and the active matrix backplane, wherein the electrophoretic medium includes at least three different types of charged pigment particles. The electrophoretic display additionally includes a controller coupled to a plurality of gate lines, each gate line being coupled to the thin-film transistors of one of the plurality of rows of pixel electrodes, and the controller being coupled to a plurality of source lines, the controller further being configured to address the pixel electrodes in a row-by-row fashion by providing both a gate voltage and a source voltage to each thin-film transistor, and non-transitory memory coupled to the controller and comprising a look-up table, wherein for a transition between a first color and a second color, wherein the look-up table includes a first waveform for causing the electrophoretic medium to transition between the first color and the second color, and a second waveform for causing the electrophoretic medium to transition between the first color and the second color, wherein the first and second waveforms are identical with respect to a number of voltage pulses and a polarity and magnitude of each of the voltage pulses, but wherein the first and second waveforms are time-shifted by at least 1 ms, e.g., 5 ms, e.g., 8 ms, e.g., 12 ms. Additionally, the controller performs the following steps when updating the electrophoretic display between the first image and the second image: receiving the first waveform from the look up table; providing the first waveform to a first row of pixel electrodes; receiving the second waveform from the look up table; and providing the second waveform to a second row of pixel electrodes adjacent the first row of pixel electrodes.

In one embodiment, the look-up table further comprises a third waveform for causing the electrophoretic medium to transition between the first color and the second color, wherein the first, second, and third waveforms are identical with respect to a number of voltage pulses and a polarity and magnitude of each of the voltage pulses, but wherein the first and second and third waveforms are time-shifted by at least 5 ms from each other, and the controller further performs the step of receiving the third waveform from the look-up table and providing the third waveform to a third row of pixel electrodes adjacent to the second row of electrodes, wherein the second row of electrodes are between the first row of electrodes and the third row of electrodes. In one embodiment, the look-up table further comprises a fourth waveform for causing the electrophoretic medium to transition between the first color and a third color, wherein the fourth waveform is not identical with respect to a number of voltage pulses and a polarity and magnitude of each of the voltage pulses of the first and second waveforms, but wherein the first and second and fourth waveforms are time-shifted by at least 1 ms from each other. In one embodiment, the first waveform and the second waveform are time-shifted by at least 5 ms, optionally at least 10 ms, optionally time shifted by between 12 ms and 20 ms. In one embodiment, the first waveform and the second waveform are time-shifted by a frame, wherein a frame is the time required to address every pixel in the active matrix backplane one time when addressing the active matrix backplane in a row-by-row fashion. In one embodiment, the magnitudes of the voltage pulses are between −15V and +15V, or between −24V and +24V. In one embodiment, the electrophoretic medium includes a reflective white particle and at least one subtractive color particle or a reflective white particle and at least one reflective color particle. In one embodiment, the electrophoretic medium includes a fourth type of electrophoretic particle. In one embodiment, two of the types of particles are negatively charged and two of the types of particles are positively charged, or wherein one of the types of particles is negatively charged and three of the types of particles are positively charged, or wherein three of the types of particles are negatively charged and one of the types of particles is positively charged. In one embodiment, the electrophoretic medium is encapsulated in microcapsules or microcells.

DETAILED DESCRIPTION

Figure 1A:
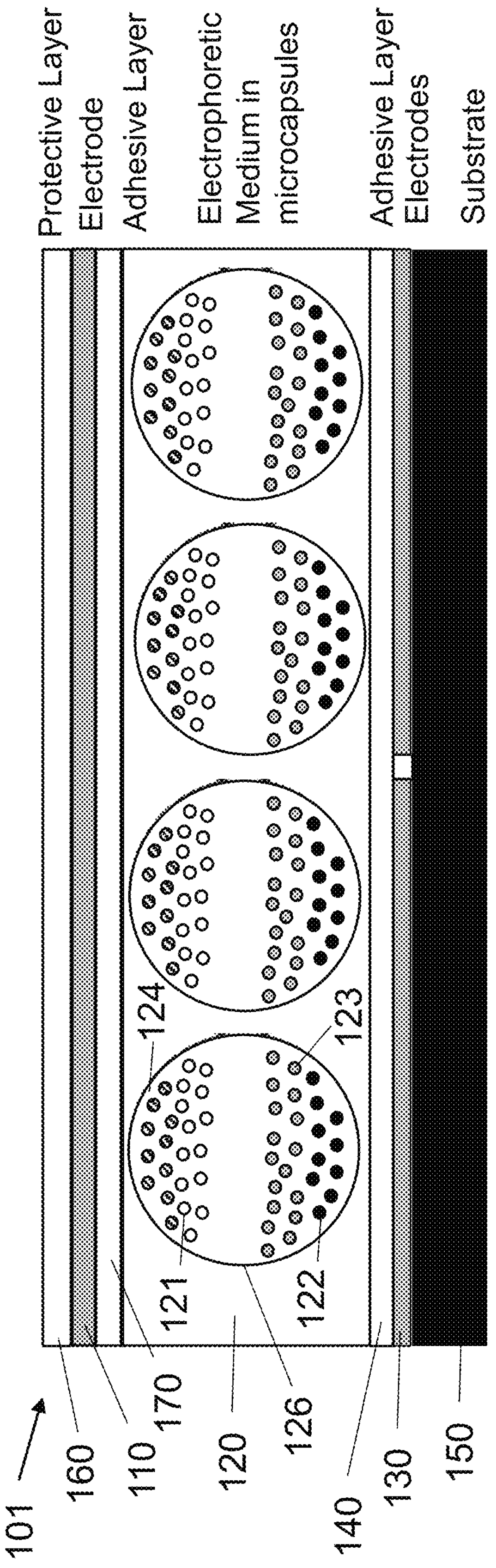
FIG. 1A is a representative cross-section of a four-particle electrophoretic display wherein the electrophoretic medium is encapsulated in capsules. The construction of FIG. 1A can be used for multi-particle electrophoretic media with both reflective and subtractive pigment particles.

The invention includes electrophoretic displays with multi-particle electrophoretic media, and improved methods for driving such multi-particle electrophoretic media. Displays of the invention typically include an active matrix backplane of pixel electrodes controlled with thin-film transistors. Typically, each pixel electrode is also couple to a storage capacitor. While the driving methods of displays are generalizable to all different types of electrophoretic displays (segmented, direct drive, indirect drive, active matrix) and may be used with a variety of waveforms, the inventive displays are often used for driving more complicated electrophoretic media, e.g., which require precise control of three, four, or more particles simultaneously. In preferred embodiments, the displays of the invention use active matrix backplanes controlled with an array of thin-film transistors and the driving waveforms are repetitive "push-pull" types. Using the techniques described herein, electrophoretic displays incorporating the disclosed drive schemes will typically appear less "flashy" as compared to addressing with traditional row-by-row updating using a single "best" waveform for a particular color transition, which has been the state of the art for some time. Such displays may include multiple subtractive colored electrophoretic particle and/or multiple reflective colored electrophoretic particles. In a preferred embodiment, the electrophoretic medium includes a white particle and cyan, yellow, and magenta subtractive primary colored particles, i.e., a WCMY system.

Methods for fabricating an electrophoretic display including four (or more) particles have been discussed in the prior art. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane bearing pixel electrodes using an electrically conductive adhesive. The assembly may alternatively be attached to one or more segmented electrodes on a backplane, wherein the segmented electrodes are driven directly.

This invention provides, among other things, an architecture and method for using a thin film transistor array to address an electrophoretic display with dipoles. Larger look-up tables are used, which include a plurality of time-shifted waveforms for each color transition. The controller can thus easily cause a phase shift in the color flashes across the display, which ultimate diminishes or removes the perception that the device is "flashing" during an update from a first image to a second image. Accordingly, a variety of multi-particle (color) electrophoretic displays can be addressed without visible flickering or flashing.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes, photonic crystals, quantum dots, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. No. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as TiO2, ZrO2, ZnO, Al2O3, Sb2O3, BaSO4, PbSO4 or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Figure 1B:
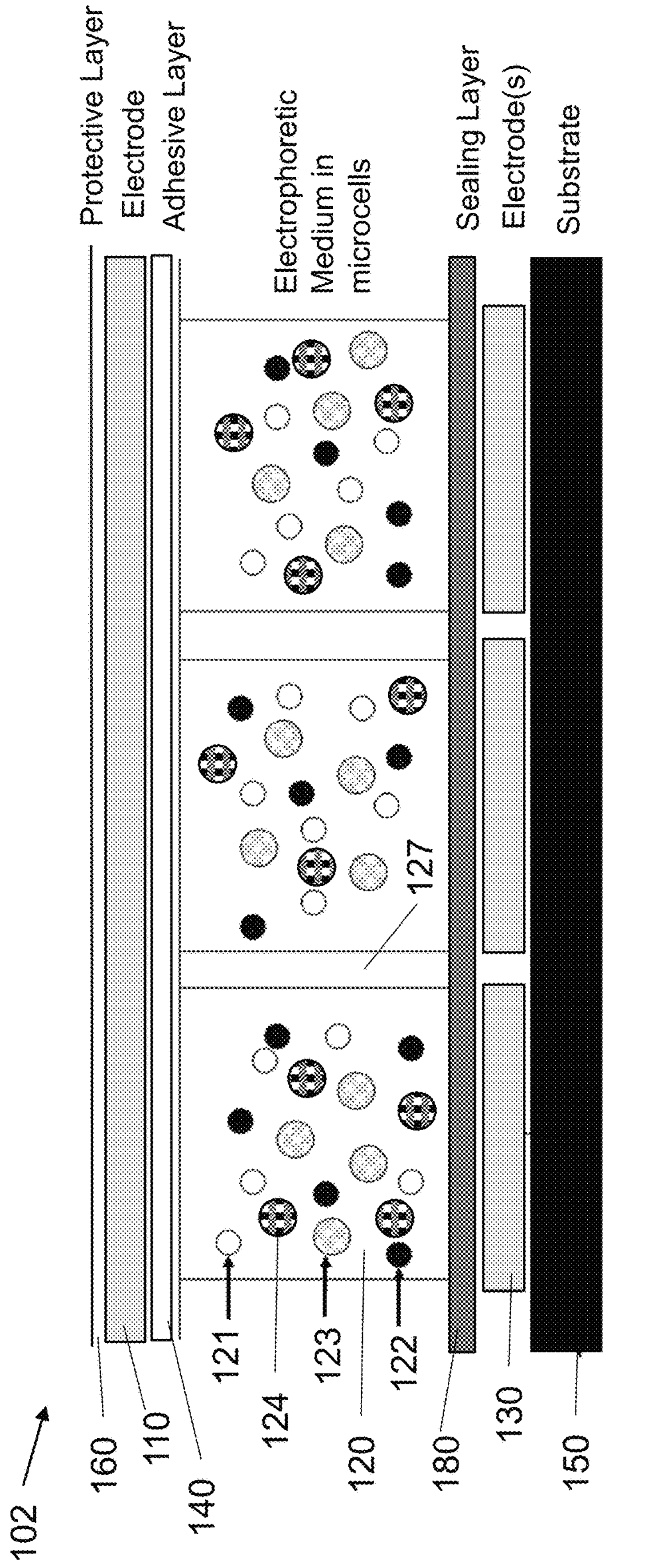
FIG. 1B is a representative cross-section of a four-particle electrophoretic display wherein the electrophoretic medium is encapsulated in microcells. The construction of FIG. 1B can be used for multi-particle electrophoretic media with both reflective and subtractive pigment particles.

As shown in FIG. 1A and FIG. 1B, an electrophoretic display (101, 102) typically includes a top transparent electrode 110, an electrophoretic medium 120, and a bottom electrode 130, which is often a pixel electrode of an active matrix of pixels controlled with thin film transistors (TFT). In the electrophoretic media 120 described herein, there are four different types of particles, 121, 122, 123, and 124, however more (or fewer) particle sets can be used with the methods and displays described herein. For example the techniques of the invention could be used with a set of three types of particles, for example white, black, and red, wherein one of the three different types of particles has a charge magnitude lower than the other two types of particles. In some instances two of the particles will be positively-charged, and one (or two) of the particles will be negatively-charged. In some instances one of the particles will be positively-charged, and three particles will be negatively-charged. In some instances one of the particles will be negatively-charged, and three particles will be positively-charged. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include a light-transmissive electrode, an electrophoretic medium, and a plurality of rear pixel electrodes. To produce a high-resolution display, e.g., for displaying images, each pixel electrode 130 is individually-addressable without interference from adjacent pixels so that an image file is faithfully reproduced on the display. One way to achieve this objective is to provide an array of non-linear elements, such as transistors or diodes, with at least one non-linear element associated with each pixel, to produce an "active matrix" display. (See FIG. 2.) An addressing or pixel electrode 130, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor.

Conventionally, in high resolution arrays, the pixels are arranged in a two-dimensional array of rows and columns, such that any specific pixel is uniquely defined by the intersection of one specified row and one specified column. (See FIG. 3) The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are typically connected to a row driver (gate driver, gate controller), which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are typically connected to column drivers (source driver, source controller), which place upon the various column electrodes voltages selected to drive the pixels in the selected row to their desired optical states. (The aforementioned voltages are with respect to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner. The time between addressing in the display is known as a "frame." Thus, a display that is updated at 60 Hz has frames that are 16 msec. A display that is updated at 85 Hz has frames that are 12 msec. A display that is updated at 120 Hz has frames that are 8 msec.

It should be noted that the magnitude of the voltage that can be provided in such row-column driving can be limited by the materials from which the non-linear element, e.g., thin film transistor, is fabricated. In many embodiments the semiconductor material is silicon, especially amorphous silicon, which is able to control driving voltages on the order of ±15 V. In other embodiments, the semi-conductor of the thin-film-transistor may be a metal oxide, such indium gallium zinc oxide (IGZO), which allows for a wider range of driving voltages, e.g., up to ±30 V e.g., as described in U.S. Patent Publication No. US 2022/0084473. This design feature is particularly pertinent when driving waveforms to sort the pigments of a multi-particle system. In such systems, it is beneficial to provide at least five voltage levels (high positive, low positive, zero, low negative, high negative), and with higher total voltages, it is easier to separate the particles. For greater details, see U.S. Patent Publication 2021-0132459.

Figure 2:
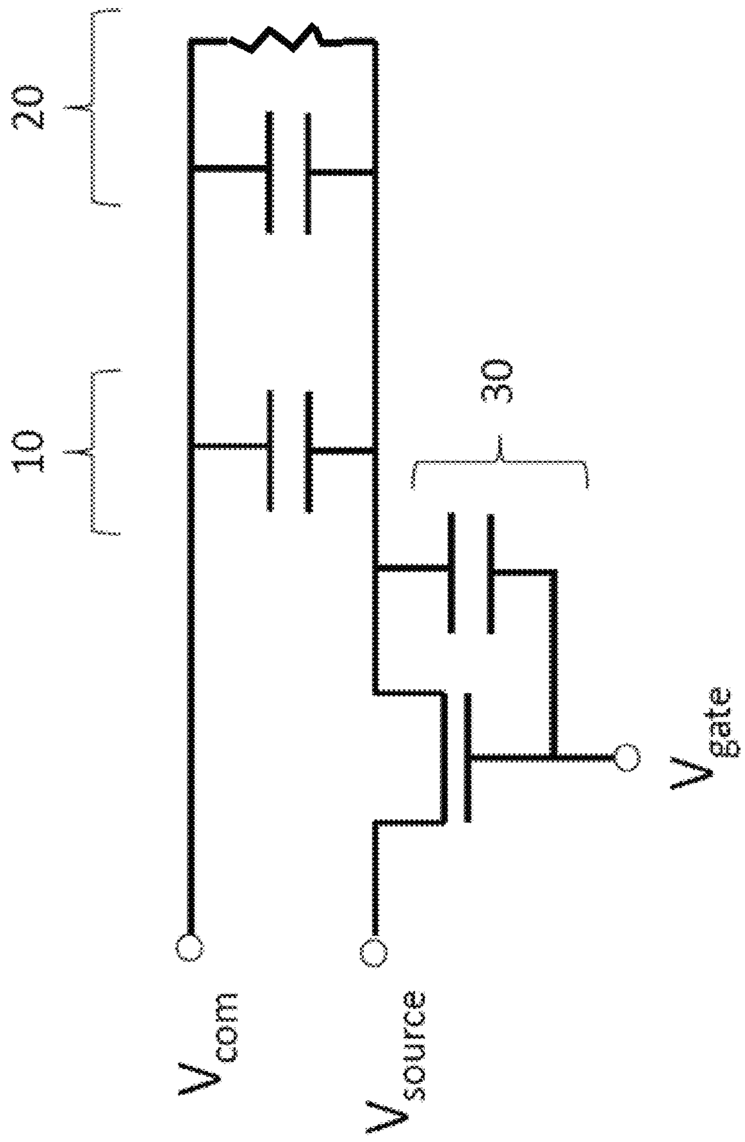
FIG. 2 illustrates an exemplary equivalent circuit of a single pixel of an electrophoretic display that uses an active matrix backplane of pixel electrodes coupled to a storage capacitor.

FIG. 2 of the accompanying drawings depicts an exemplary equivalent circuit of a single pixel of an electrophoretic display. As illustrated, the circuit includes a storage capacitor 10 formed between a pixel electrode (element 130 of FIGS. 1A and 1B) and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. [In some embodiments, to compensate for the unwanted "kickback voltage", a common potential Vcom, may be supplied to the top plane electrode and the capacitor electrode associated with each pixel, such that, when Vcom is set to a value equal to the kickback voltage (VKB), every voltage supplied to the display may be offset by the same amount, and no net DC-imbalance experienced.]

In a conventional electrophoretic display using an active matrix backplane, each pixel electrode has associated therewith a capacitor electrode (storage capacitor) such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3:
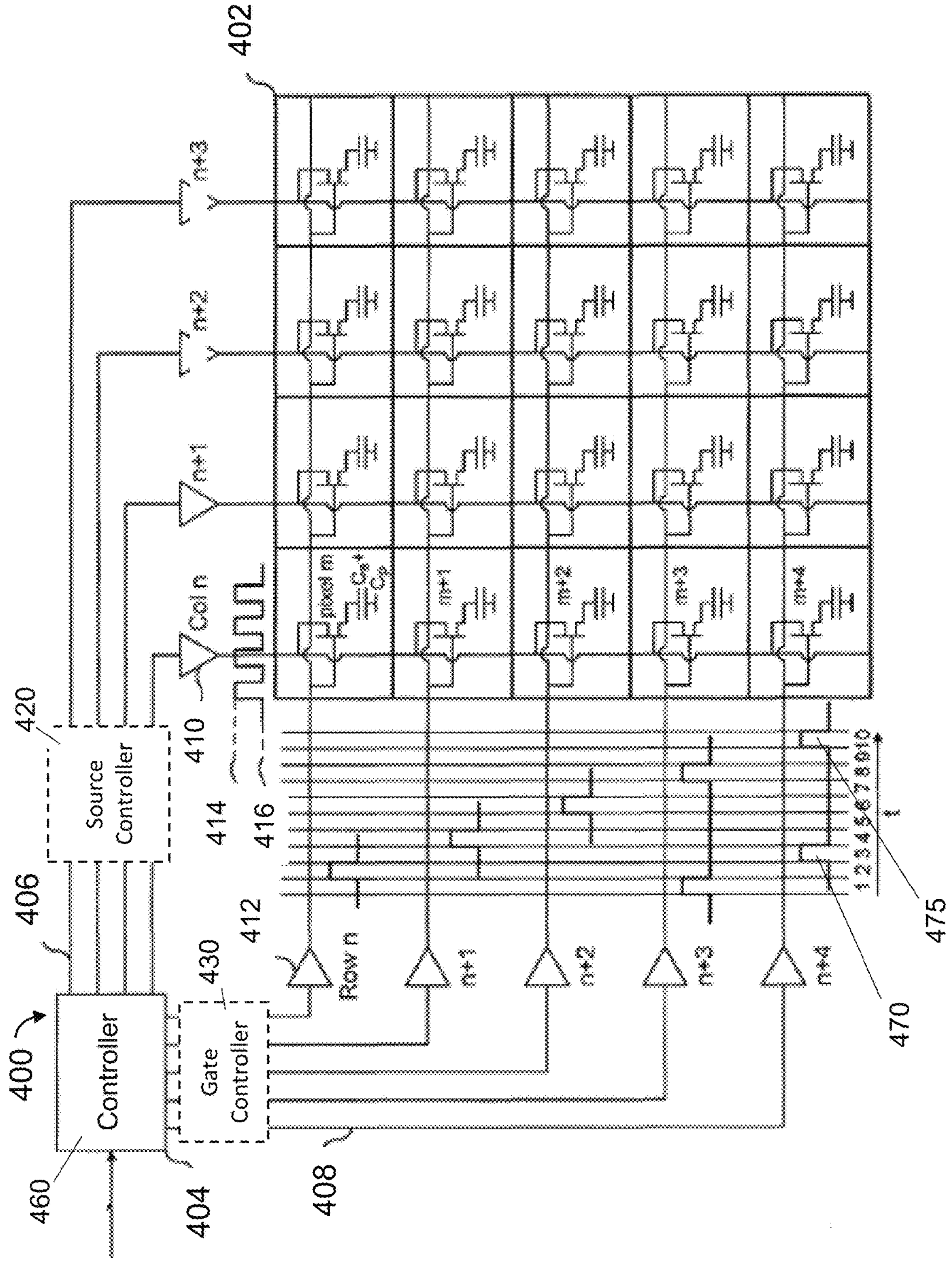
FIG. 3 is a diagrammatic view of an exemplary driving system for controlling voltages provided to pixel electrodes in an active matrix device. The resulting driving voltages can be used to set an optical state of a multi-particle electrophoretic medium.

Additional details of the row-column addressing used in an "active matrix" display are shown in FIG. 3. An addressing or pixel electrode, which addresses one pixel, is fabricated on a substrate 402 and connected to the appropriate voltage sources 404 and 406 through the associated non-linear element. It is understood that the voltage sources 404 and 406 may originate from separate circuit elements or the voltages can be delivered with the assistance of a single power supply and a power management integrated circuit (PMIC). In some instances an intervening source controller 420 is used to control the supplied voltage, however in other embodiments the controller 460 is configured to control the entire addressing process, including coordinating the gate and source lines. It is also to be understood that FIG. 3 is an illustration of the layout of an active matrix backplane 400 but that, in reality, the active matrix has depth and some elements, e.g., the TFT, may actually be underneath the pixel electrode, with a via providing an electrical connection from the drain to the pixel electrode above.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column (scan) line 406, while the gates of all the transistors in each row are connected to a single row (gate) line 408; again the assignment of sources to rows and gates to columns is conventional but essentially arbitrary, and could be reversed if desired. The gate lines 408 are optionally connected to a gate line driver 412, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column scan lines 406 are optionally connected to scan line drivers 410, which place upon the various scan lines 406 voltages selected to drive the pixels in the selected row to their desired optical states. (The aforementioned voltages are relative to a common top electrode, and is not shown in FIG. 3.) With conventional driving, after a pre-selected interval known as the "line address time" the selected row is deselected, the next row is selected, and the voltages on the column drivers are changed so that the next line of the display is written. This process is repeated in a linear fashion so that the entire display is written in a row-by-row manner. As shown in FIG. 3, the temporal spacing between gate voltage pulses of respective frames is typically constant, and represent the rhythm of line by line addressing. Notably, the invention does not implement an even spacing between respective gate voltage pulses for a given address row of pixel electrodes.

Figure 4:
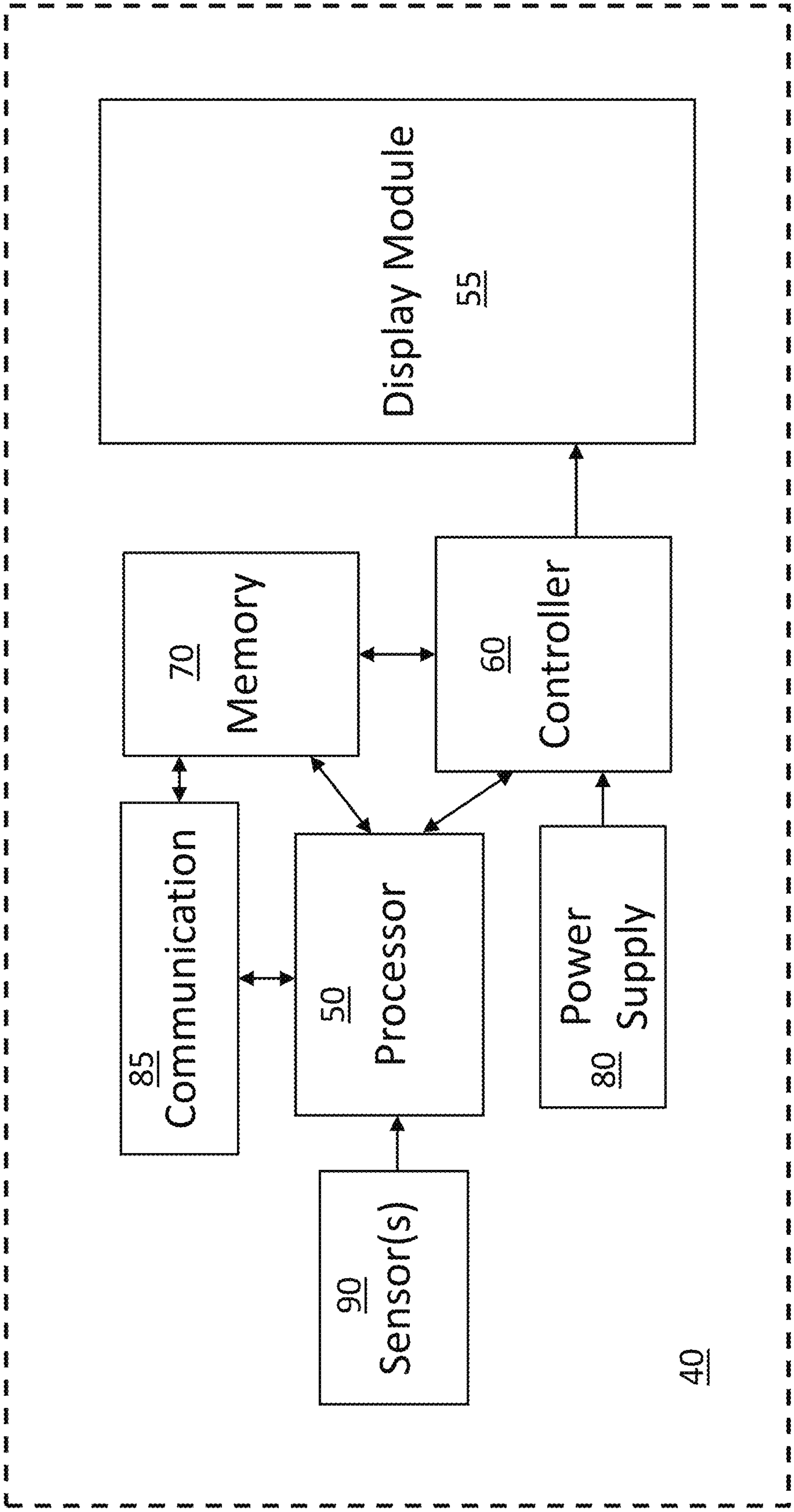
FIG. 4 illustrates an exemplary electrophoretic display that includes a display module. The electrophoretic display also includes a processor, non-transitory memory, one or more power supplies, and a controller. The electrophoretic display may also include sensors to allow the electrophoretic display to adjust operational parameters based upon the ambient environment, e.g., temperature and illumination.

The active matrix backplane described with respect to FIG. 3 is coupled to an electro-optic medium, e.g., as illustrated in FIGS. 1A and 1, and typically sealed to create a display module 55, as shown in FIG. 4. Such a display module 55 becomes the focus of a electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. Of course, if the electrophoretic display is being used as a sensor or counter, the content may relate to other inputs. The processor is typically a mobile processor chip, such as made by Freescale or Qualcomm, although other manufacturers are known. The processor is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. In many embodiments, the non-transitory memory 70 is incorporated directly into the end consumer device by incorporating all of the elements of FIG. 4 into a circuit board or package. However, in some instances, the driving circuitry is not directly incorporated into the display, such as when the display becomes the exterior of an object such as an automobile.

Waveforms (discussed below) are typically stored in the non-transitory memory 70, however they can also be incorporated into the controller 60 or the processor 50 or they can be stored on the cloud and downloaded via communications 85. A number of look-up tables can be used to facilitate the methods of the invention, especially to provide time shifted waveforms to the controller 60 as appropriate. In particular for a given transition from a first color to a second color in an electrophoretic medium having eight primaries a look up table could include instructions for updating from color 1 to a later color (with no time offset) in look-up slots 1 to 8, while instructions for updating from color 1 to a later color (with a first time offset) in look-up slots 9 to 16, and instructions for updating from color 1 to a later color (with a second time offset) in look-up slots 17 to 24, and so on. Of course, this type of look-up table can also be indexed for improved performance in view of operating conditions, such as device temperature, battery health, front-light color, front-light intensity, etc.

Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

Figure 5:
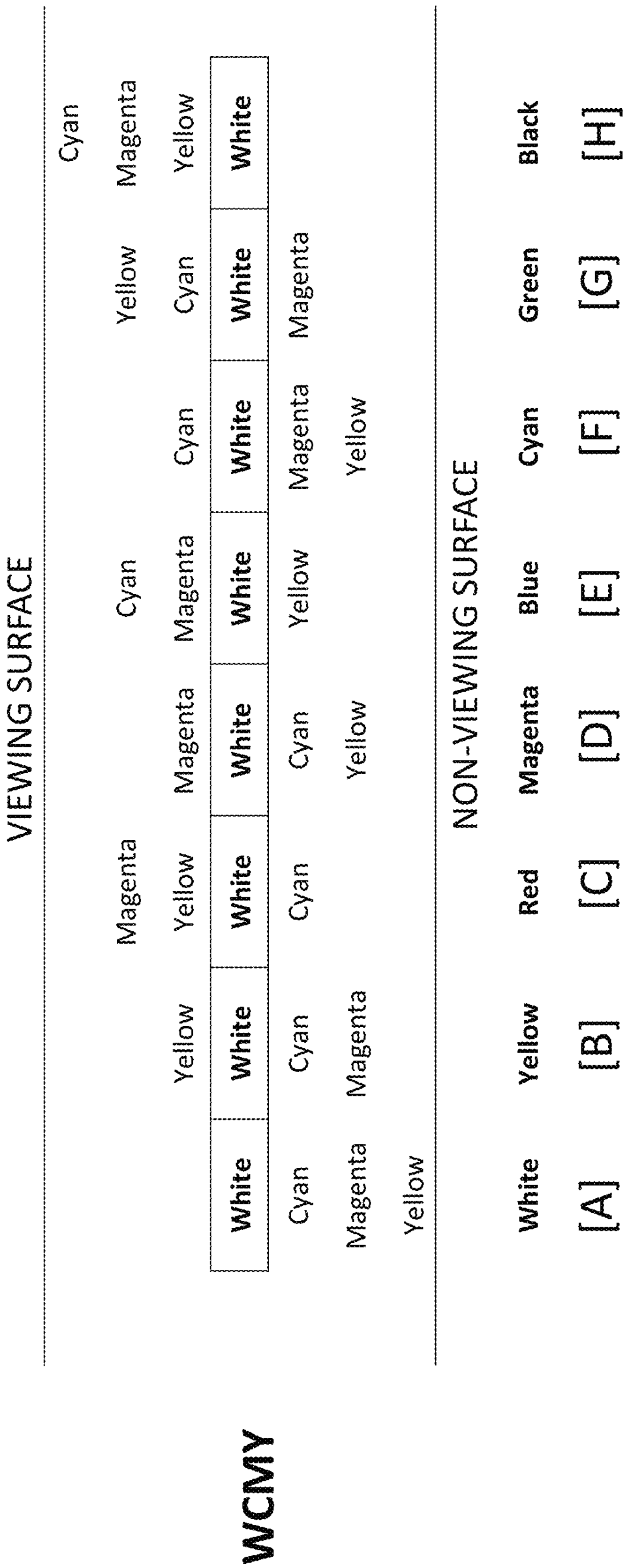
FIG. 5 illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

As shown in FIG. 5, the ACEP (e.g., WCMY) system in principle works similar to printing on bright white paper in that the viewer only sees those colored pigments that are on the viewing side of the white pigment (i.e., the only pigment that scatters light). In FIG. 5, it is assumed that the viewing surface of the display is at the top (as illustrated), i.e., a user views the display from this direction, and the illumination light is also incident from this direction. In FIG. 5 the light scattering particle is assumed to be the white pigment. This light-scattering white particle forms a white reflector against which any particles above the white particles (as illustrated in FIG. 5) are viewed. A portion of the incident light passes through the subtractive particles, is reflected from the white particles below the subtractive particles, passes back through these particles and emerges from the display. A different portion of the incident light is absorbed by the subtractive particles. Thus, the particles above the white particles may absorb various colors and the color appearing to the user is that resulting from the combination of particles above the white particles. Any particles disposed below the white particles (behind from the user's point of view) are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 5), there are no particles above the white particles and the pixel simply displays a white color. When a single particle is above the white particles, the color of that single particle is displayed, yellow, magenta and cyan in Situations [B], [D] and [F] respectively in FIG. 5. When two particles lie above the white particles, the color displayed is a combination of those of these two particles; in FIG. 5, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 5), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

FIG. 5 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 5.)

Figure 6A:
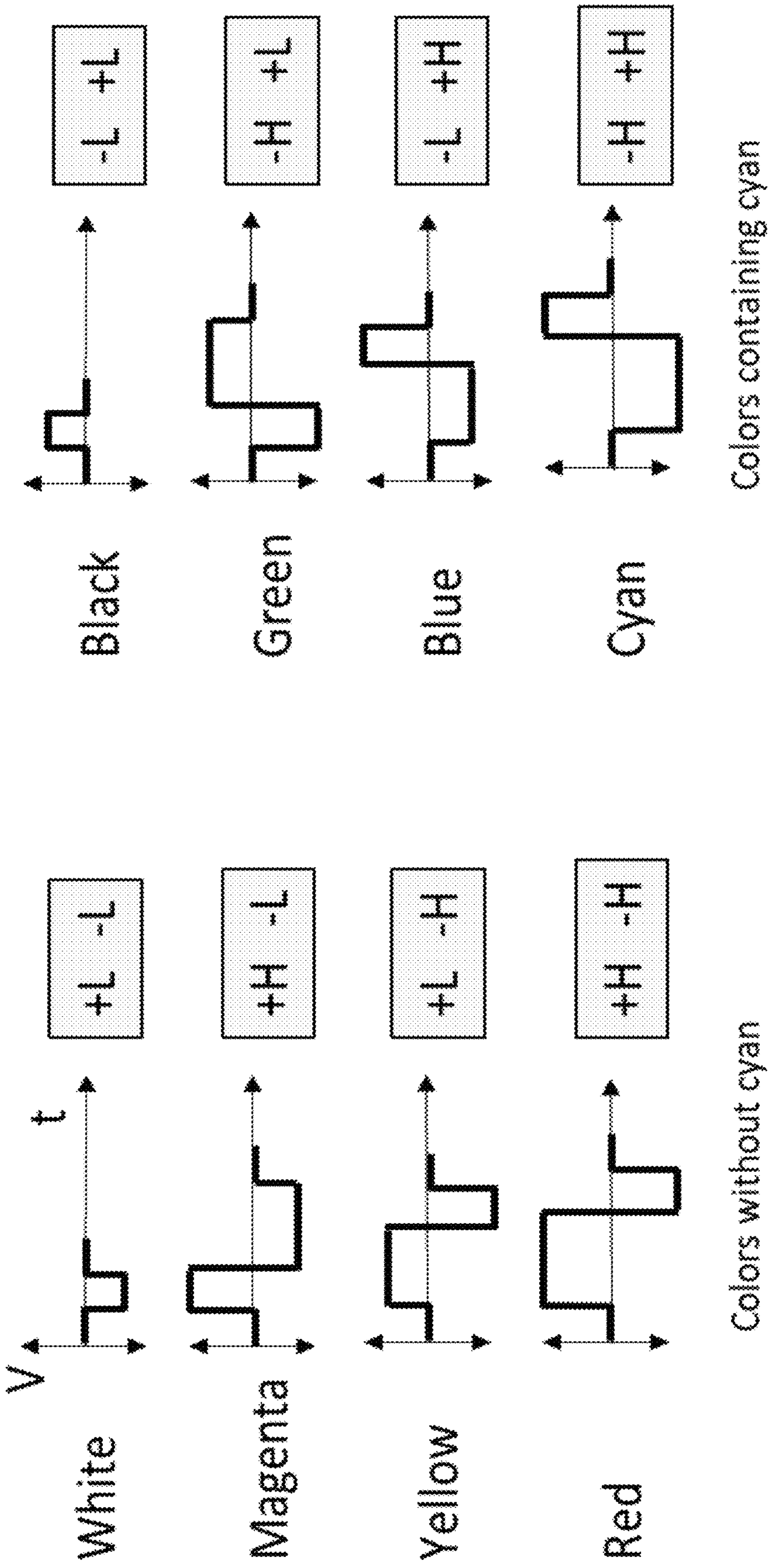
FIG. 6A (Prior Art)
FIG. 6A shows exemplary push-pull drive schemes for addressing an electrophoretic medium including three subtractive (cyan, yellow, magenta) particles and a scattering (white) particle.

FIG. 6A shows push-pull waveforms (in simplified form) used to drive a four-particle WCMY electrophoretic display system described above. Such waveforms consist of a dipole comprising two pulses of opposite polarity. Typically, each dipole has a pulse of voltage V1 applied for a time t1 followed by a voltage V2 applied for time t2. The dipole is impulse balanced when $V1t1+V2t2=0$. The magnitudes and lengths of these pulses determine the color obtained. At a minimum, there should be five such voltage levels. FIG. 6A shows high and low positive and negative voltages, as well as zero volts. Typically, "low" (L) refers to a range of about five-15V, while "high" (H) refers to a range of about 15-30V. In general, the higher the magnitude of the "high" voltages, the better the color gamut achieved by the display. In some instances, especially where more colors are required, there medium voltages are also included. The "medium" (M) level is typically around 15V; however, the value for M will depend somewhat on the composition of the particles, as well as the environment of the electrophoretic medium.

Notably with the dipole waveforms of FIG. 6A, the dipoles used to provide magenta, yellow, green and blue colors are at least approximately impulse balanced. On the other hand, it is not necessary to use dipole addressing to produce black and white. Simple monopole pulses in either direction will move the oppositely-charged colored and white pigments towards and away from the viewing surface, and thus the display behaves under these circumstances like a conventional display containing black and white pigments. Additionally, because these monopole pulses are not DC balanced, additional charge clearing pulses must be incorporated into the device drive protocol, either at the beginning or end of an image update, or at the end of an extended unbalanced drive sequence, such as may happen when scrolling text. Dipole addressing can break the symmetry even when the waveform is impulse balanced overall, however. For example, one can have $\int V dt=0$, and $\int V^3 dt \neq 0$. See, e.g., Dukhin A S, Dukhin S S, "Aperiodic capillary electrophoresis method using an alternating current electric field for separation of macromolecules." Electrophoresis, 2005 June; 26(11):2149-53. Then, as long as pigment mobility depends on applied electric field, this kind of waveform can result in overall pigment drift.

Figure 6B:
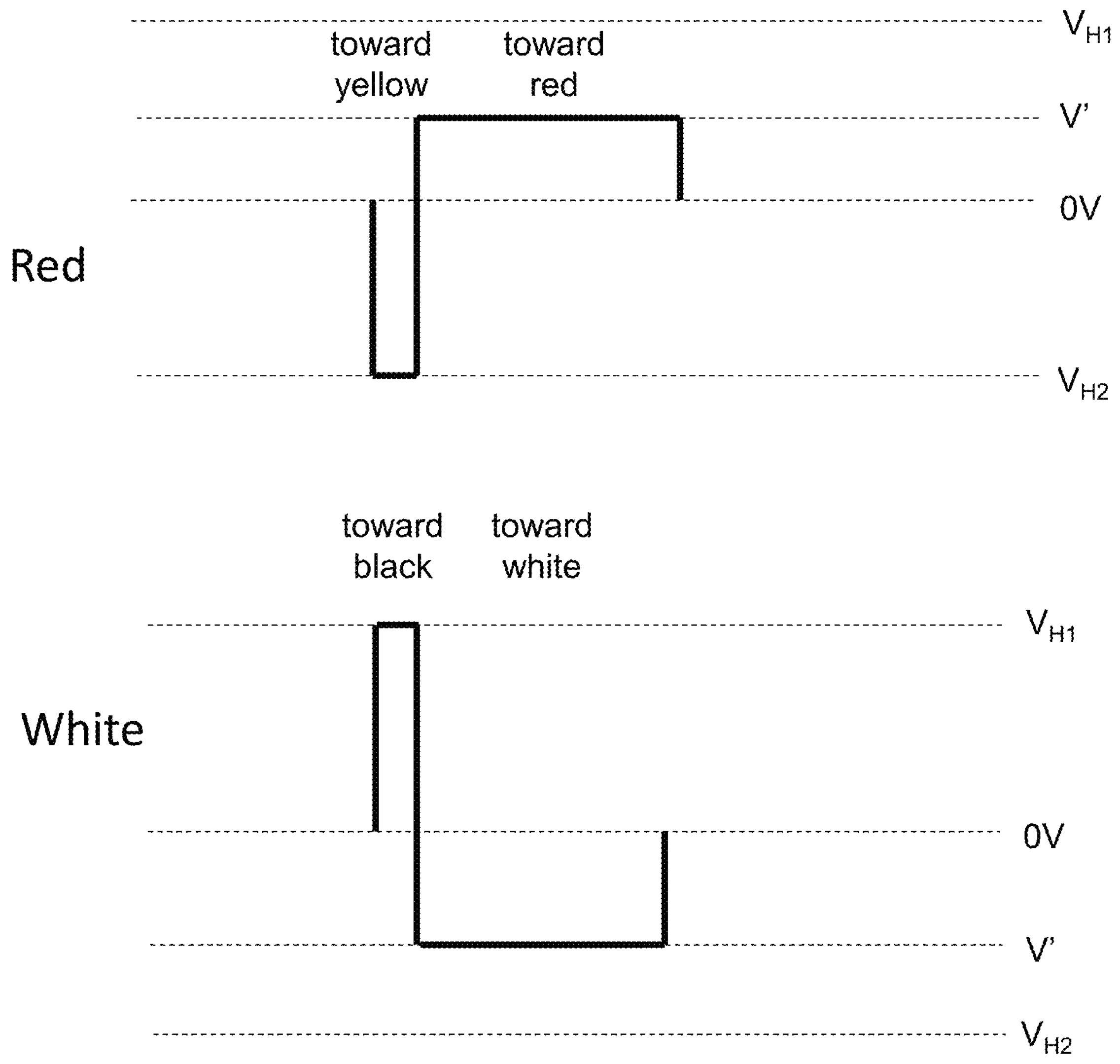
Fig. 6B (Prior Art)
FIG. 6B shows exemplary push-pull drive schemes for addressing an electrophoretic medium including one absorptive (black) particle, two reflective (red, yellow) particles, and a scattering (white) particle.

FIG. 6B shows two typical push-pull waveforms that are used to cause the color of the lesser charged particles to appear at the viewing surface for a four particle system including a scattering white particle, an absorptive black particle, and two colored scattering particles (yellow and red). See, e.g., U.S. Pat. No. 10,339,876. In the instance depicted in FIG. 6B, the yellow particle is highly charged with a negative polarity and the white particle has lower charge with a negative polarity. The black particle is highly charged with a positive polarity and the red particle has lower charge and a positive polarity.

Figure 7:
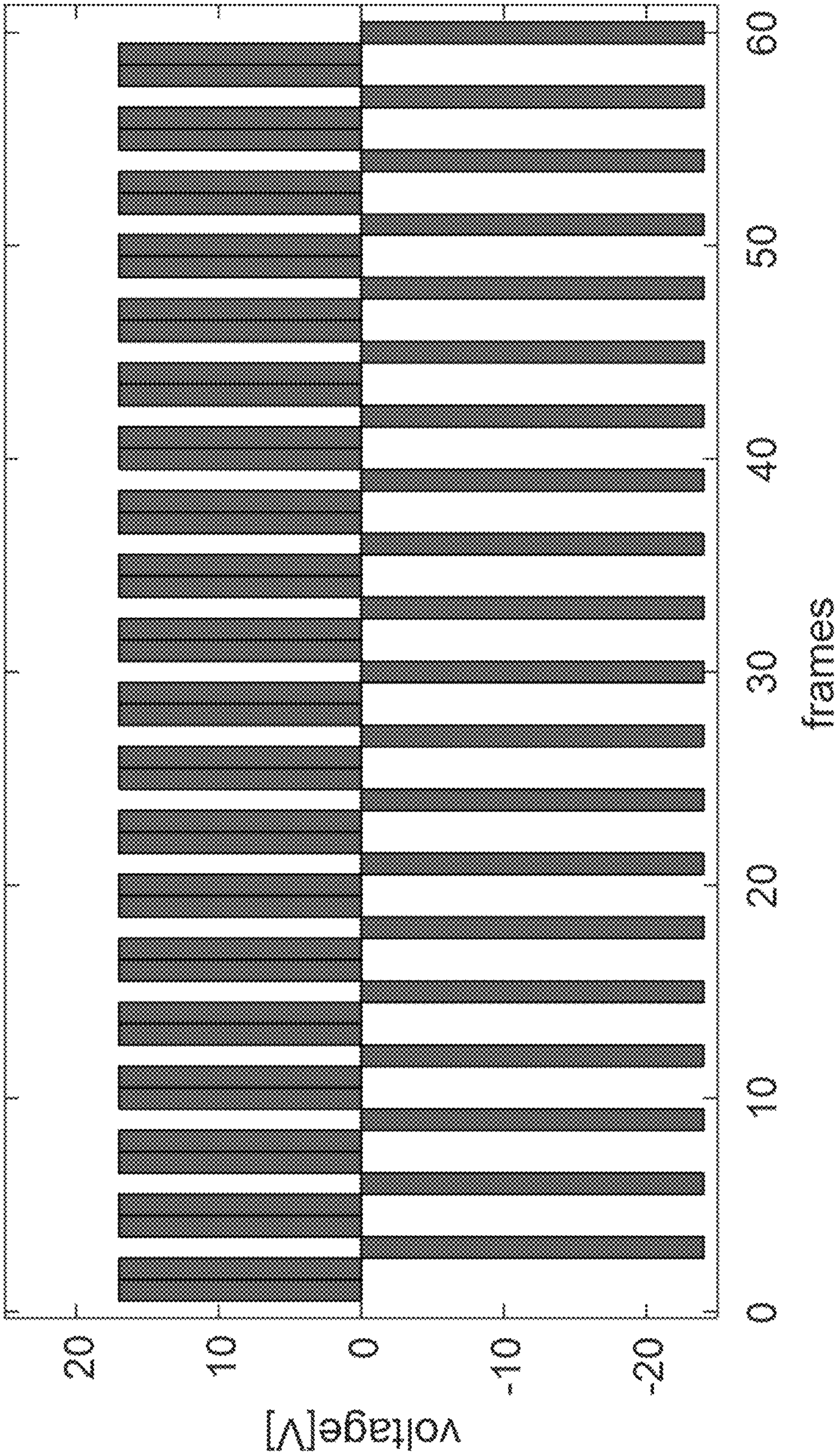
FIG. 7 depicts a "typical" driving waveform delivered to a pixel electrode during a single update from a first color to a second color. Notably, the waveform includes repeating push-pull voltages.

As can be seen in FIGS. 6A-6B, typically one pulse in a dipole used to produce a particular color is of shorter duration than the other. Furthermore, although FIGS. 6A and 6B show the simplest push-pull waveforms (dipoles) required to form colors, it will be appreciated that practical waveforms typically require multiple repetitions of these patterns, as shown in FIG. 7. The repetitive dipoles are the primary source of flicker in the display as the pigments are driven first in one direction and then in the other. The appearance of the transition from one color to another will be jarring if the frequency of this flicker is too low.

One way to decrease the flash for a given transition from a first color to a second color is to provide waveforms for the same transition that are offset (slightly) in time. Similar to noise-cancelling headphones, by providing coordinated peaks when the dominant waveform has valleys, a viewer does not perceive the large swings between color, i.e., the image is optically quieter. The method for this improvement is shown in more detail in FIGS. 8-10. In one embodiment, a first row of the display receives a "normal" waveform, and then subsequent rows receive time-shifted waveforms until the pattern begins to repeat again. For example, the waveforms going to a second row of the display are shifted by a single frame, the waveforms going to a third row of the display are shifted by another frame from the waveforms going to the second row, and so on. Regarding FIG. 8, the first row could receive Phase 2 (bottom), the second row could receive Phase 1 (middle) and the third row could receive Phase 0 (top), or some other order. It is also appreciated that the different rows may use waveforms that are shifted by less (or more) than a frame, for example shifted by around 10 ms, for example shifted by around 5 ms.

Figure 9A:
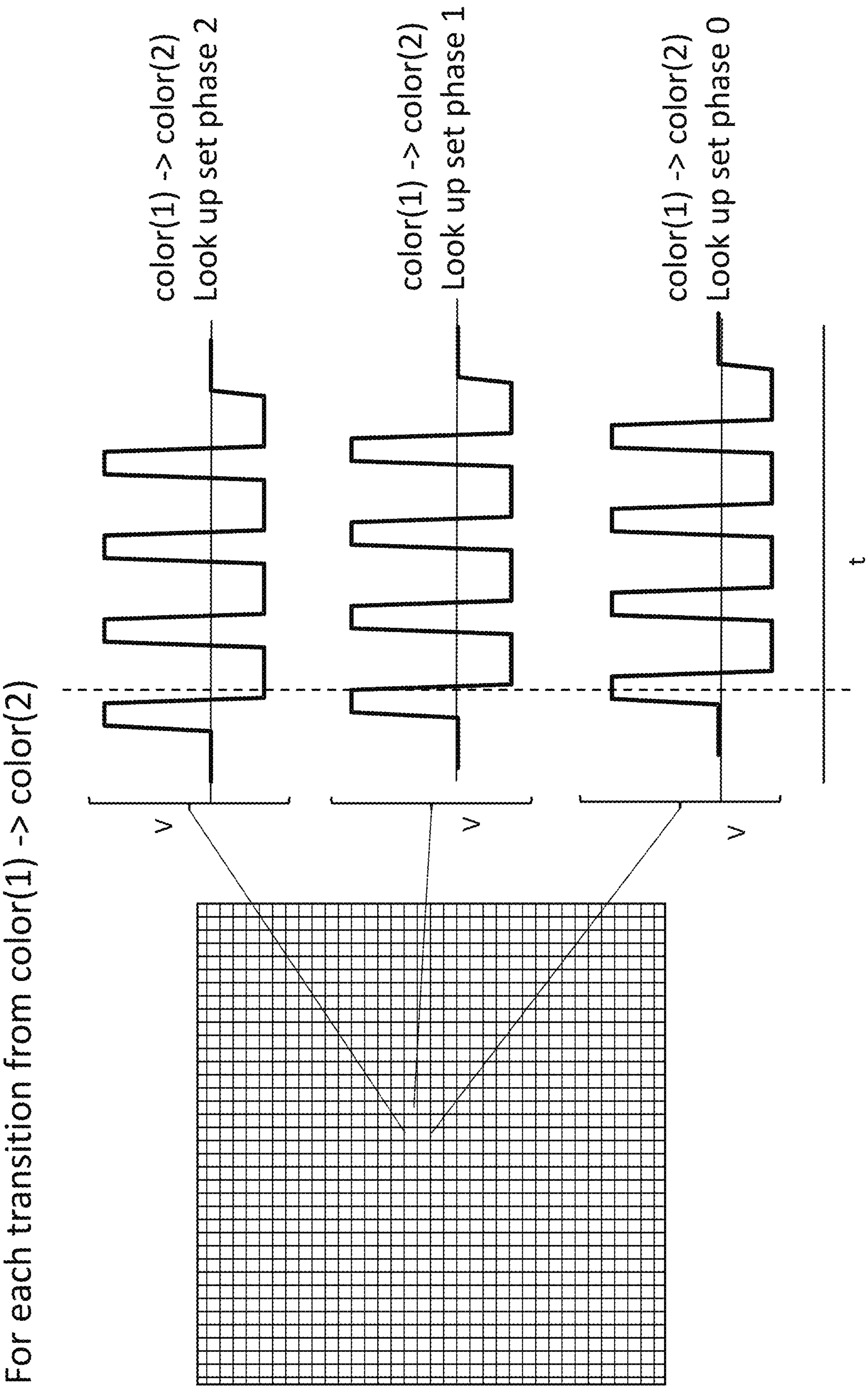
FIG. 9A illustrates a display of the invention whereby identical waveforms that are offset are delivered to three adjacent rows of pixel electrodes undergoing the same color transition.
Figure 9B:
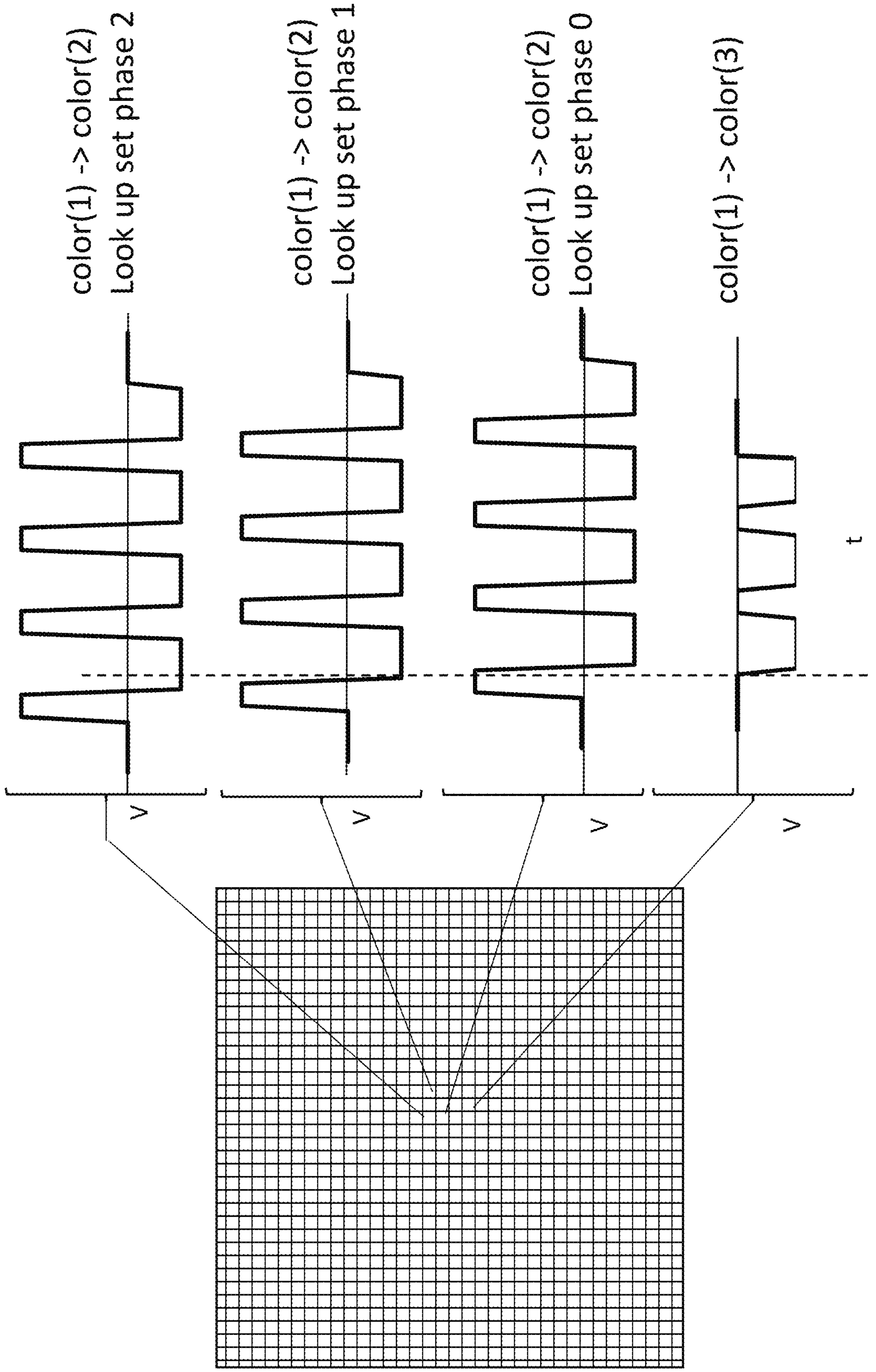
FIG. 9B illustrates a display of the invention whereby identical and different waveforms that are offset are delivered to adjacent rows of pixel electrodes undergoing different color transitions.
Figure 10:
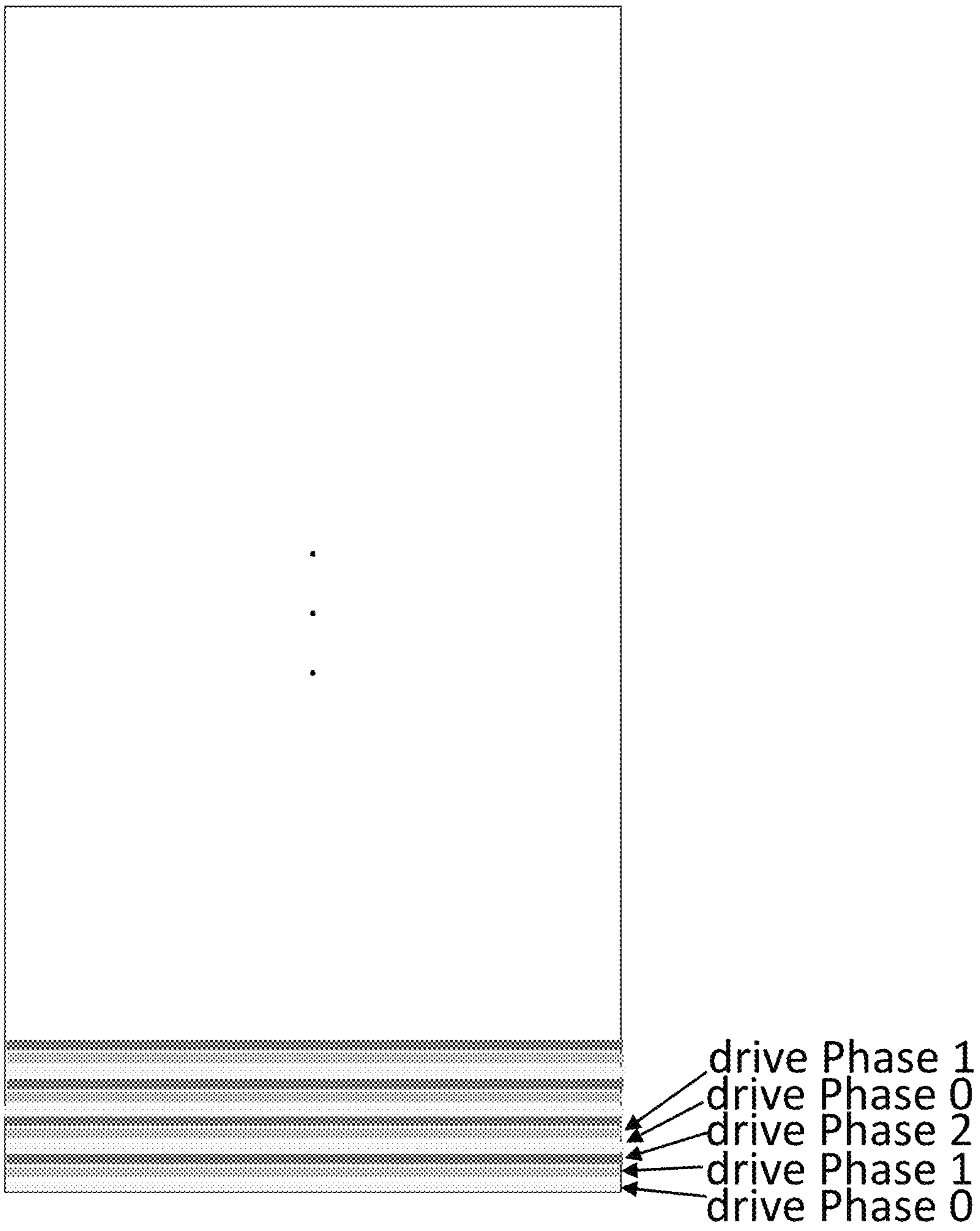
FIG. 10 illustrates an update pattern for a display of the invention whereby three different offset waveforms are delivered to various rows in a portion of a display undergoing the same transition from a first color to a second color. The same techniques can also be used when more than one color transition is required in the portion of the display undergoing an update.

FIG. 9A illustrates the interplay of the same waveform, time-shifted in two forms and stored in a look up table in the non-transitory memory. For a first row of the active matrix backplane, the pixels undergoing a transition from color 1 to color 2 receive a first waveform to cause the desired change in the electrophoretic medium. Subsequent rows receive a waveform that is the same in terms of number of pulses, pulse magnitude, and pulse polarity, but wherein the waveform that is time shifted by e.g., one frame, e.g., 5 ms, e.g., 8 ms, e.g., 12 ms. This second waveform is stored in a different set of waveforms from the look up table. The second waveform may belong to a set of time-shifted waveforms that are all assigned to every other row, every third row, every fourth row, etc. Subsequent rows receive yet a third waveform that is the same in terms of number of pulses, pulse magnitude, and pulse polarity, but wherein the waveform that is further time-shifted. In some embodiments, a fourth waveform can be included to also cause some pixels to undergo a transition from color 1 to color 3, as depicted in FIG. 9B. A wider raster pattern using the technique of FIG. 9A is shown in FIG. 10. Using this technique, the overall color update from color 1 to color 2 is only lengthened by tens of milliseconds, which is not perceptible to a human viewer when compared to the traditional drive method wherein each row updating from color 1 to color 2 receives the same waveform during a single frame. Furthermore, because non-transitory memory is relatively inexpensive, there is little additional cost to providing time-shifted sets of waveforms for each possible color transition, e.g., as stored in one or more look up tables. A further benefit of the interlacing time-shifted pattern of FIGS. 9A and 10 is that technique evens out the current draw for the gate drivers, especially when large portions of the display are being driven between the same colors during an image update. Whereas with normal driving, all of the gate lines in an update area draw current at roughly the same time, as defined by the push-pull waveform, the interlaced time-shifted driving results in fewer gate lines simultaneously drawing full current. In some instances, the reduction in current swings will allow for less expensive electrical components to be used in the device. In some instances, this current levelling will result in less power drain, therefore the battery charge will last longer for the same number of updates. In other embodiments, gate line direction scanning with interlacing allows that current to be drawn in mostly same way as non-interlace. If interlacing were to be used with the source drivers (i.e., through the source lines), the misalignment of the waveform with interlacing could results in large overhead in current consumption than normal, as the voltages needs to be switched more often even with a uniform color patch.

Figure 8:
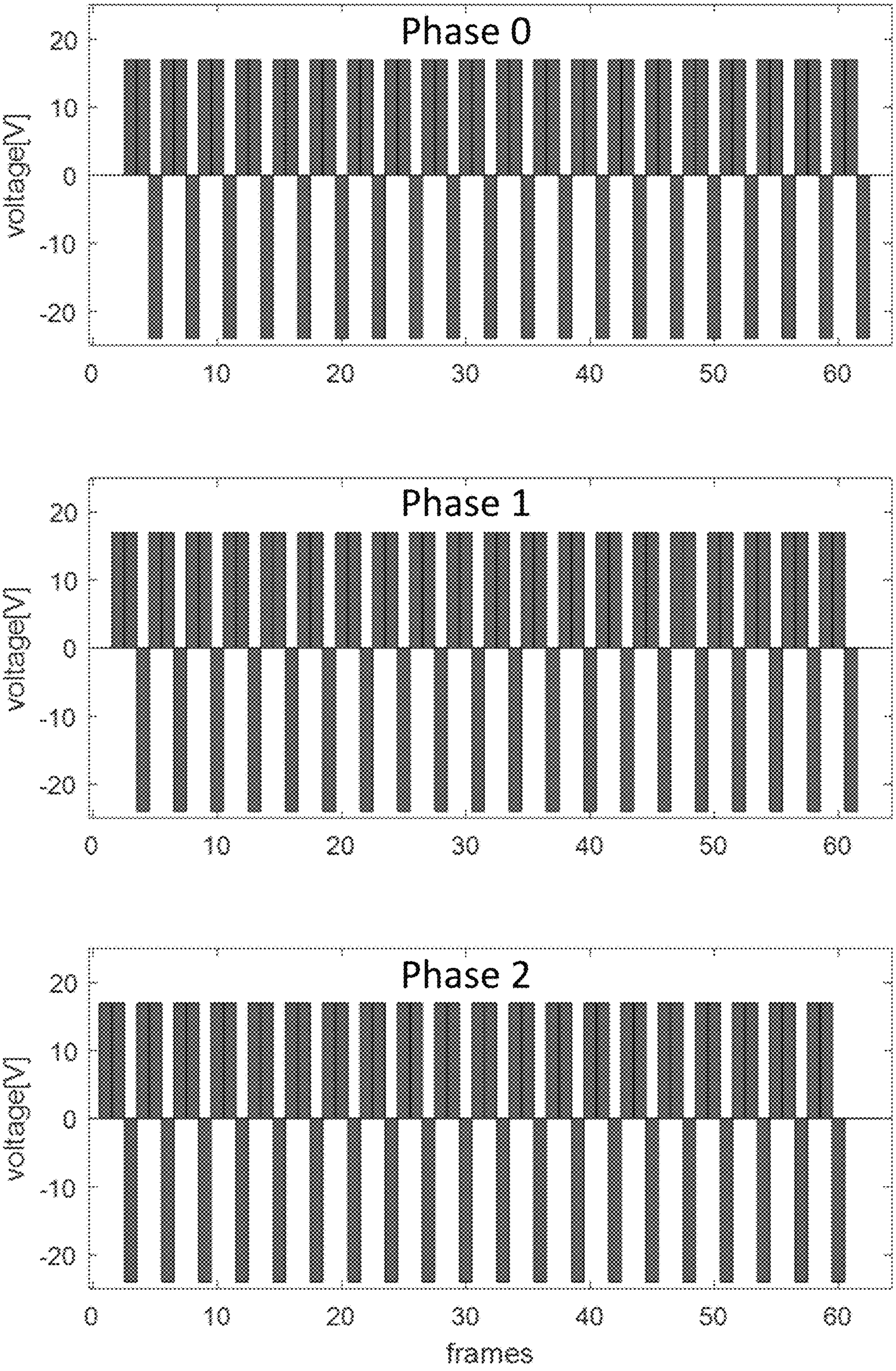
FIG. 8 shows three identical push-pull waveforms that have been time shifted by one frame (approximately 12 ms) in order to reduce the flashiness of an update from a first color to a second color.

It should be noted that the techniques of FIGS. 8-10 are not limited to active matrix backplanes because adjacent segmented displays can also take advantage of time-shifted waveforms to decrease flash, especially when using repeating push-pull waveforms to drive a color transition. Furthermore, the techniques are not limited to repeating push-pull waveforms because more complicated waveforms, which are not simple push-pull can be offset in time to provide a less flashy transition. Additionally, for a driving system incorporating both push-pull waveforms and more complicated waveforms, it is possible to "hide" the more complicated waveforms amongst the interlaced push-pull waveforms that are time-shifted using the described methods. For example, for the ACEP system, having the 8 color waveforms shown in FIG. 6A, when one of the waveform is not a push pull (and more complicated) while the rest are push-pull, the multi-line interlacing of the push-pull waveforms hides the more complicated transitions, such that the overall transition is less "jarring" to a viewer. While all of the previous techniques can be applied using expanded look up tables, it is also possible to program the controller (in communication with both the gate lines and the source lines) to provide a short pause before continuing with the next line update in order to achieve less flashy updates. Additionally, the technique is not limited to every other line or every three lines interlacing. The interlacing need not be row by row, and can include blocks of rows. For example, 4 frames single pixel line interlacing for a 4 frames periodic push pull waveform, or, a 3 frame double pixel lines interlacing for a 3 frame periodic push pull waveform, or a 6 frames single lines interlacing for a 3 frame periodic push pull with possibility of shifting 1% frames though changes to source/gate driving etc.

EXAMPLE

Figure 11A:
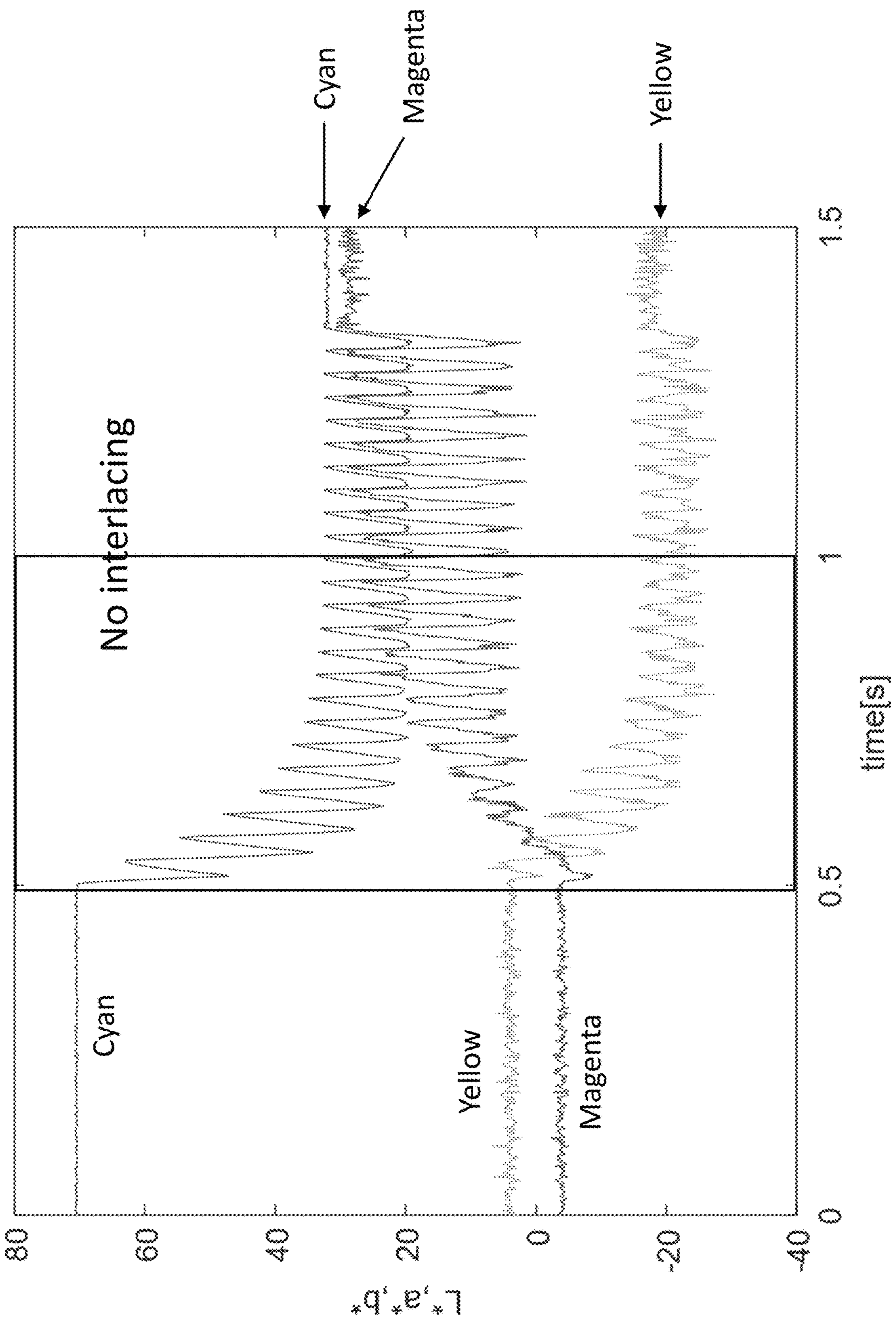
FIG. 11A illustrates the color transients (as measured by reflectivity in L*, a*, b* space) produced when an electrophoretic display including a white reflective particle and subtractive particles of cyan, yellow, and magenta is addressed with the repeating dipole waveform of FIG. 7 across the entire display and no time shifted (interlaced) waveforms are used.
Figure 11B:
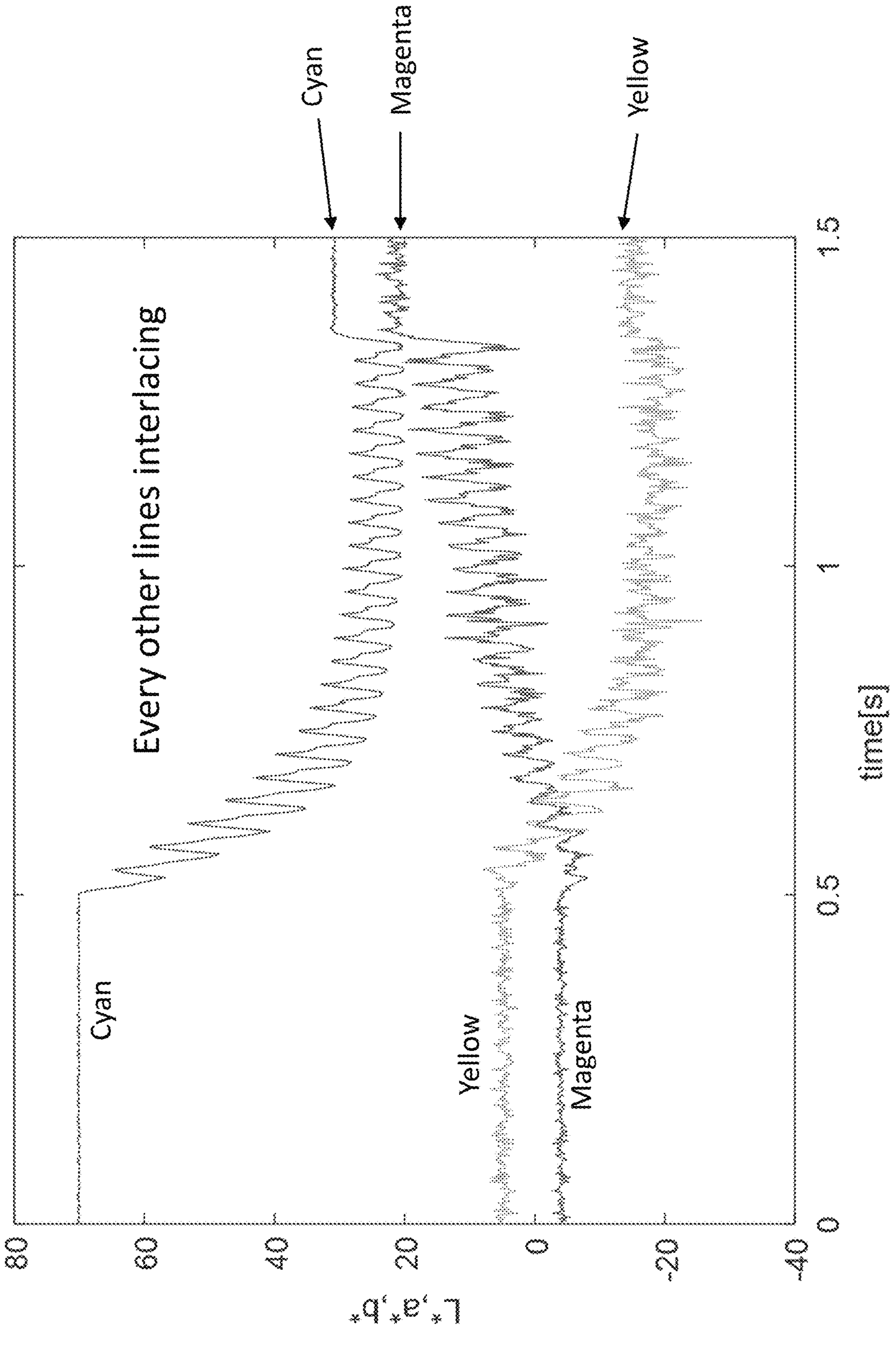
FIG. 11B illustrates the color transients (as measured by reflectivity in L*, a*, b* space) produced when an electrophoretic display including a white reflective particle and subtractive particles of cyan, yellow, and magenta is addressed with the repeating dipole waveform of FIG. 7 across the entire display, and odd and even pixel electrode rows receive time shifted (interlaced) waveforms. Each even row receives the same waveform and each odd row receives the same waveform, but the odd rows are time shifted by about 12 ms.
Figure 11C:
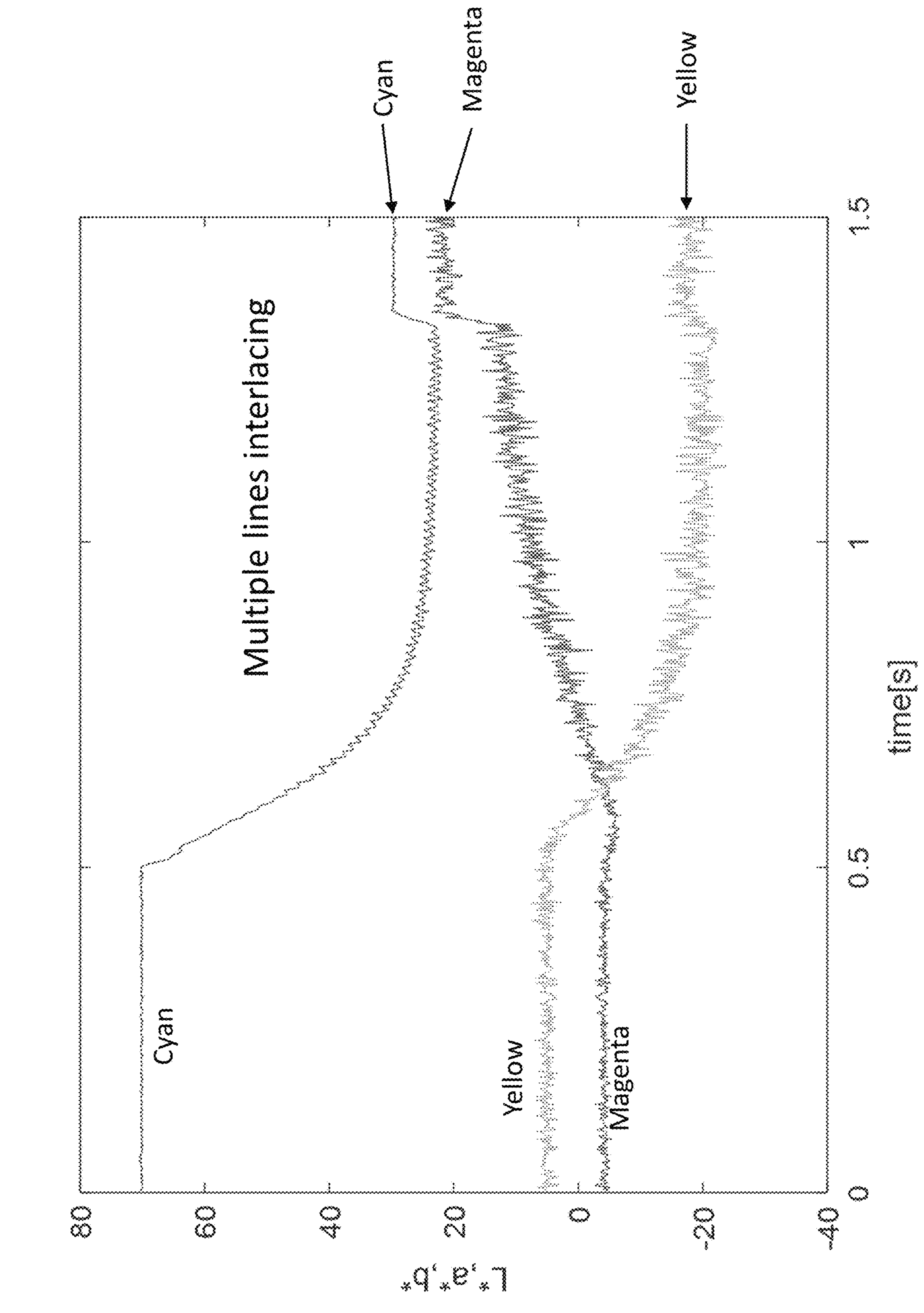
FIG. 11C illustrates the color transients (as measured by reflectivity in L*, a*, b* space) produced when an electrophoretic display including a white reflective particle and subtractive particles of cyan, yellow, and magenta is addressed with the repeating dipole waveform of FIG. 7 across the entire display, and three different time-shifted waveforms are used where each time-shifted waveform is delivered to one-third of the rows. Each subsequent row is shifted by one frame (approximately 12 ms) until the time-shifted waveforms are in phase with the previous waveforms.

FIGS. 11A to 11C show the optical transients that occur when a repeating push pull waveform is used to update a display from color 1 to color 2 using a variety of interlacing schemes facilitated by expanded look up tables. The optical transients of FIGS. 11A to 11C show the measured reflectivity in L*,a*,b* of each of the colors in the cyan, magenta, yellow medium. In FIG. 11A an experimental display is driven with a repeating push-pull waveform of three frames, similar to FIG. 7, but with intervening rests. The display starts from the white state, and all of the pixels of the display are addressed by a sequence of dipoles comprising a first pulse of −24V and 12 ms duration followed by a second pulse of +12V and 16 ms duration. Between the first pulses and the second pulses rests of 0V for 12 ms have been inserted. (These rests are not required to form colors but are necessary to measure the optical densities as the waveform progresses because of limitations of integration of the spectrometer used.) In FIG. 11A, all of the rows are addressed with typical row-by-row addressing, and there are no time-shifted waveforms. As can be seen, in FIG. 11A, all three color pigments move in phase, resulting in large swings back and forth in the measured reflectivity of the colors, which results in a "flashy" update.

FIG. 11B shows the reflectivity measurements of the same display, driven from a white state to a second color using the same waveform, but wherein the waveform provided to every other row is time shifted by one frame (approximately 12 ms), that is, every-other-row interlacing. Because of the interplay of the peaks and valleys of the reflectivity due to the time-shifted waveforms, the overall effect is smaller swings in the overall reflectivity, and as a result, the display update appears less flashy. This technique can be extended further to include three different time shifted waveforms, wherein each waveform is delivered to ⅓ of the display in an interlaced fashion. As can be seen in FIG. 11C, the swings in reflectivity have all but disappeared in this instance, and the resulting transition from a white display to a first color is gradual and taking marginally more time than the example of FIG. 11A. Comparing FIG. 11A to FIG. 11C, the benefits of the invention are quite apparent.

The invention allows a non-flashing update of a multi-pigment color display without requiring substantial modification to the driving electronics. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. An electrophoretic display comprising:

a light-transmissive electrode;

an active matrix backplane comprising a plurality of rows of pixel electrodes, each pixel electrode being coupled to a thin-film transistor comprising a gate line and a source line;

an electrophoretic medium disposed between the light-transmissive electrode and the active matrix backplane, wherein the electrophoretic medium includes at least three different types of charged pigment particles;

a controller coupled to a plurality of gate lines, each gate line being coupled to the thin-film transistors of one of the plurality of rows of pixel electrodes, and the controller being coupled to a plurality of source lines, the controller further being configured to address the pixel electrodes in a row-by-row fashion by providing both a gate voltage and a source voltage to each thin-film transistor; and non-transitory memory coupled to the controller and comprising a look-up table, wherein for a transition between a first color and a second color and between a first color and a third color, the look-up table includes:

a first waveform for causing the electrophoretic medium to transition between the first color and the second color, a second waveform for causing the electrophoretic medium to transition between the first color and the second color, a third waveform for causing the electrophoretic medium to transition between the first color and the second color, and a fourth waveform for causing the electrophoretic medium to transition between the first color and a third color, wherein the first, second, and third waveforms are identical with respect to a number of voltage pulses and a polarity and magnitude of each of the voltage pulses, while the fourth waveform is not identical with respect to the number of voltage pulses and the polarity and magnitude of each of the voltage pulses of the first, second, and third waveforms, and wherein the first, second, third, and fourth waveforms are time-shifted by at least 1 ms from each other;

the controller performing the following steps when updating the display between the first image and the second image:

receiving the first waveform from the look up table;

providing the first waveform to a first row of pixel electrodes;

receiving the second waveform from the look up table;

providing the second waveform to a second row of pixel electrodes adjacent the first row of pixel electrodes;

receiving the third waveform from the look up table;

providing the third waveform to a third row of pixel electrodes adjacent to the second row of electrodes, wherein the second row of electrodes is between the first row of electrodes and the third row of electrodes.

2. The electrophoretic display of claim 1, wherein the first waveform and the second waveform are time-shifted by at least 5 ms.

3. The electrophoretic display of any of claim 1, wherein the first waveform and the second waveform are time-shifted by a frame, wherein a frame is the time required to address every pixel in the active matrix backplane one time when addressing the active matrix backplane in a row-by-row fashion.

4. The electrophoretic display of claim 1, wherein the magnitudes of the voltage pulses are between −15V and +15V or between −24V and +24V.

5. The electrophoretic display of claim 1, wherein the electrophoretic medium includes a reflective white particle and at least one subtractive color particle or a reflective white particle and at least one reflective color particle.

6. The electrophoretic display of claim 5, wherein the electrophoretic medium includes a fourth type of electrophoretic particle.

7. The electrophoretic display of claim 6, wherein two of the types of particles are negatively charged and two of the types of particles are positively charged.

8. The electrophoretic display of claim 6, wherein one of the types of particles is negatively charged and three of the types of particles are positively charged.

9. The electrophoretic display of claim 6, wherein three of the types of particles are negatively charged and one of the types of particles is positively charged.

10. The electrophoretic display of claim 1 wherein the electrophoretic medium is encapsulated in microcapsules or microcells.

* * * * *